US012168243B2

(12) United States Patent
Floeder et al.

(10) Patent No.: US 12,168,243 B2
(45) Date of Patent: Dec. 17, 2024

(54) AUTOMATED LIQUID ADHESIVE DISPENSING USING PORTABLE MEASURING DEVICE

(71) Applicant: 3M INNOVATIVE PROPERTIES COMPANY, St. Paul, MN (US)

(72) Inventors: Steven P. Floeder, Shoreview, MN (US); Jeffrey P. Adolf, Rochester, MN (US); Gregory P. Moriarty, Vadnais Heights, MN (US); Cory D. Sauer, Star Prairie, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/754,664

(22) PCT Filed: Oct. 7, 2020

(86) PCT No.: PCT/IB2020/059423
§ 371 (c)(1),
(2) Date: Apr. 8, 2022

(87) PCT Pub. No.: WO2021/074745
PCT Pub. Date: Apr. 22, 2021

(65) Prior Publication Data
US 2024/0075495 A1    Mar. 7, 2024

Related U.S. Application Data

(60) Provisional application No. 62/926,807, filed on Oct. 28, 2019, provisional application No. 62/926,817, (Continued)

(51) Int. Cl.
*B05C 11/10*    (2006.01)
*B05C 5/02*    (2006.01)
(Continued)

(52) U.S. Cl.
CPC ........ *B05C 11/1005* (2013.01); *B05C 5/0216* (2013.01); *B05C 11/1034* (2013.01);
(Continued)

(58) Field of Classification Search
CPC .......... B05C 11/1005; G05B 19/41875; G05B 219/45238; G05B 2219/50063
(Continued)

(56) References Cited

U.S. PATENT DOCUMENTS 4,724,302 A    2/1988 Penney
4,935,261 A *  6/1990 Srivastava .......... B05C 11/1034
                                                    356/627

(Continued)

OTHER PUBLICATIONS

International Search Report for PCT Application No. PCT/IB2020/059423, mailed on Jan. 25, 2021, 4 pages.

*Primary Examiner* — Vishal Pancholi
(74) *Attorney, Agent, or Firm* — Vincent Pham

(57) ABSTRACT

A system includes a robot, a measuring device, and a processor. The robot is configured to dispense, based on at least one process parameter, a liquid adhesive bead onto a substrate. The measuring device is configured to measure at least one characteristic of the bead shape. The processor is configured to determine, based on a reference bead shape and at least one reference process parameter, response surface profile of the liquid adhesive. The processor is configured to compare the measured bead shape to a reference bead shape and, responsive to determining the measured bead shape is different than the reference bead shape, determine, based on the response surface profile, at least one updated process parameter. The updated process parameter is configured to cause the robot to dispense a second bead having the reference bead shape.

15 Claims, 13 Drawing Sheets

Related U.S. Application Data filed on Oct. 28, 2019, provisional application No. 62/914,798, filed on Oct. 14, 2019.

(51) Int. Cl.
*B05D 1/26* (2006.01)
*G05B 19/418* (2006.01)

(52) U.S. Cl.
CPC ......... *B05D 1/26* (2013.01); *G05B 19/41875* (2013.01); *G05B 2219/45238* (2013.01); *G05B 2219/50063* (2013.01)

(58) Field of Classification Search
USPC .......................................................... 222/52
See application file for complete search history.

(56) References Cited

U.S. PATENT DOCUMENTS

| | | | |
|---|---|---|---|
| 6,001,181 A * | 12/1999 | Bullen | B05C 5/0216 118/679 |
| 9,858,637 B1 | 1/2018 | Quach | |
| 2006/0096530 A1 | 5/2006 | Klein | |
| 2007/0000442 A1 | 1/2007 | Schucker | |
| 2010/0250011 A1 | 9/2010 | Burkus, II | |
| 2018/0009000 A1* | 1/2018 | Shang | B25J 9/1664 |
| 2018/0348730 A1 | 12/2018 | Reekmans | |
| 2019/0329423 A1* | 10/2019 | Shimodaira | B25J 13/06 |

* cited by examiner

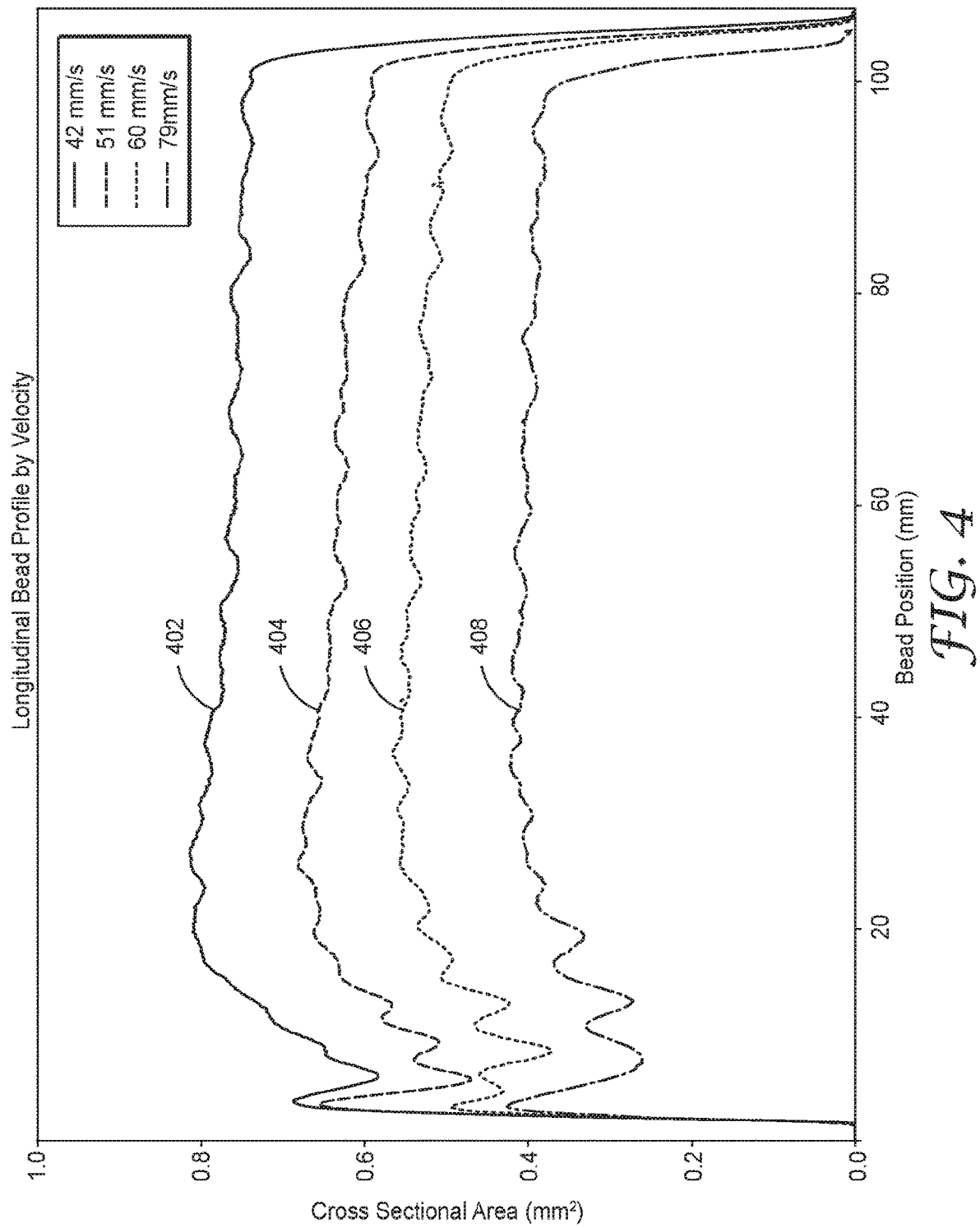

AUTOMATED LIQUID ADHESIVE DISPENSING USING PORTABLE MEASURING DEVICE

CROSS REFERENCE TO RELATED APPLICATIONS

This application is a national stage filing under 35 U.S.C. 371 of PCT/IB2020/059423, filed Oct. 7, 2020, which claims the benefit of U.S. Provisional Application No. 62/926,817, filed Oct. 28, 2019, U.S. Provisional Application No. 62/926,807, filed Oct. 28, 2019, and U.S. Provisional Application No. 62/914,798, filed Oct. 14, 2019, the disclosure of which is incorporated by reference in its/their entirety herein.

TECHNICAL FIELD

The present disclosure relates to the field of liquid adhesive dispensing.

BACKGROUND

Liquid adhesives are used in industries including medical devices, consumer electronics, automotive, aerospace, and many others. Various machines and systems have been used to dispense and apply adhesive to material.

SUMMARY

The described systems and technique may be used to measure an output adhesive bead shape for a given automated liquid adhesive dispensing process, comparing it against a target bead shape, and automatically identifying controllable process parameters to be altered to achieve a stable and controlled process. As described herein, automated liquid adhesive dispensing includes application of a liquid adhesive to a substrate. An automated liquid adhesive dispensing process may require establishing initial process parameters and controlling process parameters, as well as identifying and correcting for uncontrollable process conditions. Additionally, some automated liquid adhesive dispensing processes may require complex dispensing paths.

In some examples, the described systems and techniques may be used to automatically generate a response curve associated with controllable process parameters and the output bead shape. In some examples, the described systems and technique may be used to represent arbitrary or complex dispense paths with a linear dispense path incorporating the relevant process parameters, which enable evaluation of bead shape, prediction of adhesive bead shape for complex paths, facilitates optimization of process parameters at reduced complexity and computing resources.

In some examples, the disclosure describes a method that includes controlling, using at least one process parameter, a robot within a manufacturing environment to dispense a bead of a liquid adhesive onto a surface of a substrate, the bead having a bead shape based on the at least one process parameter. The method also includes measuring, by a portable measuring device positioned within the manufacturing environment, at least one characteristic of the bead shape. The method also includes accessing, with a processor of the portable measuring device, one or more response surface profiles of the liquid adhesive defining a reference bead shape of a reference bead of the liquid adhesive and at least one reference process parameter. The method also includes comparing, by the processor, the bead shape to the reference bead shape. The method also includes, responsive to determining the bead shape is different than the reference bead shape, determining, by the processor, based on the at least one reference process parameter, at least one updated process parameter, wherein the at least one updated process parameter is configured to cause the robot to dispense a second bead having the reference bead shape.

In some examples, the disclosure describes a system that includes a robot within a manufacturing environment, a portable measuring device within the manufacturing environment, and a processor of the portable measuring device. The robot is configured to dispense a bead of a liquid adhesive onto a surface of a substrate, the bead having a bead shape based on at least one process parameter of the robot. The portable measuring device is configured to measure at least one characteristic of the bead shape. The processor is configured to access one or more response surface profiles of the liquid adhesive defining a reference bead shape of a reference bead of the liquid adhesive and at least one reference process parameter; compare the bead shape to the reference bead shape; and responsive to determining the bead shape is different than the reference bead shape, determine, based on the at least one reference process parameter, at least one updated process parameter, where the at least one updated process parameter is configured to cause the robot to dispense a second bead having the reference bead shape.

In some examples, the disclosure describes a system that includes a robot within a management system, a measuring device within the management system, a first processor communicatively coupled to the robot and the measuring device, a second robot within a manufacturing site, a portable measuring device within the manufacturing site, and a second processor of the portable measuring device. The robot is configured to dispense a bead of a liquid adhesive onto a surface of a substrate, the bead having a bead shape based on at least one process parameter of the robot. The measuring device is configured to measure at least one characteristic of the bead shape. The first processor is configured to determine, based on the bead shape and the at least one process parameter, a response surface profile of the liquid adhesive, where the response surface profile defines a relation between the bead shape and the at least one process parameter. The second processor is configured to dispense a second bead of the liquid adhesive onto a surface of a second substrate, the bead having a second bead shape based on at least one second process parameter of the second robot. The portable measuring device is configured to measure at least one characteristic of the second bead shape. The second processor is configured to receive, from the processor, response surface profile; compare the second bead shape to the bead shape; and responsive to determining the second bead shape is different than the bead shape, determine, based on the at least one process parameter, at least one updated process parameter, where the at least one updated process parameter is configured to cause the second robot to dispense a third bead having the bead shape.

In some examples, the disclosure describes a method that includes dispensing, by a robot within a manufacturing environment using at least one process parameter, one or more linear beads of a liquid adhesive representative of a target complex dispense path onto a surface of a substrate, the linear beads extending along a longitudinal axis and having a bead shape transverse to the longitudinal axis based on the at least one process parameter. The method also includes measuring, via a one-dimensional scan by a measuring device positioned within the manufacturing environment, at a plurality of discrete positions along the longitudinal axis of the linear beads, at least one characteristic of the bead shape. The method optionally includes adjusting, by a processor of the measuring device, based on one or more response surface profiles and the at least one characteristic of the bead shape, the at least one process parameter; and dispensing the liquid adhesive using the target complex dispense path and the at least one of adjusted process parameter In some examples, the disclosure describes a system that includes a robot within a manufacturing environment, a measuring device within the manufacturing environment, and a processor communicatively coupled to the measuring device. The robot is configured to, using at least one process parameter, dispense one or more linear beads of a liquid adhesive representative of a target complex dispense path onto a surface of a substrate, the bead extending along a longitudinal axis and having a bead shape transverse to the longitudinal axis based on the at least one process parameter. The measuring device is configured to measure, via one-dimensional scan, at a plurality of discrete positions along the longitudinal axis of the linear beads, at least one characteristic of the bead shape. The processor is configured to adjust, based on one or more response surface profiles and the at least one characteristic of the bead shape, the at least one process parameter; and cause the robot to dispense the liquid adhesive using the target complex dispense path and the at least one of adjusted process parameter.

The details of one or more examples are set forth in the accompanying drawings and the description below. Other features, objects, and advantages will be apparent from the description and drawings, and from the claims.

BRIEF DESCRIPTION OF THE DRAWINGS

FIG. 4 is a graph illustrating example bead shapes as cross-sectional area variation along a longitudinal axis of respective beads.

Figure 1A:
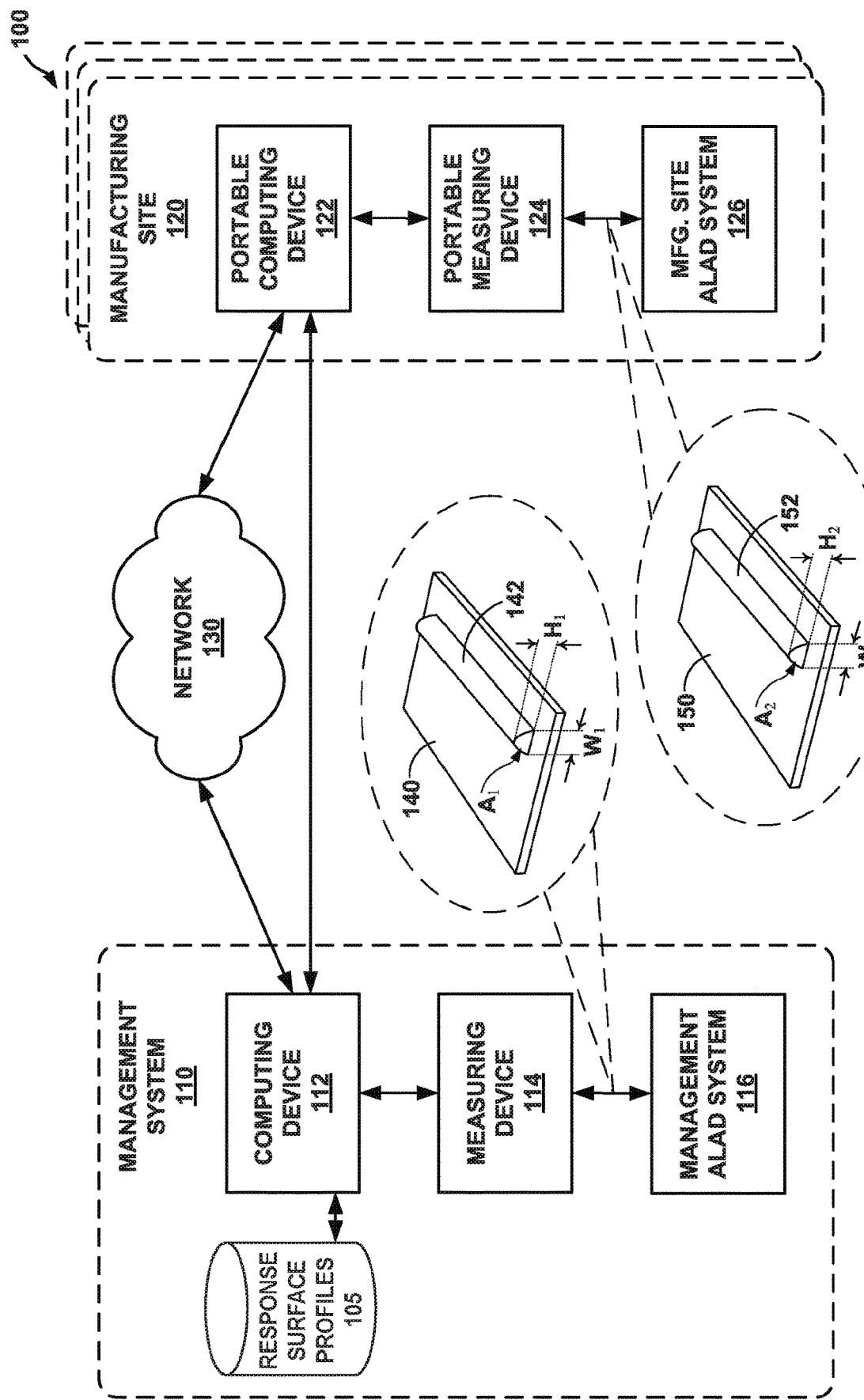
FIG. 1A is a conceptual diagram illustrating an example manufacturing environment for automated liquid adhesive dispensing.

Structural changes to the examples set forth in this disclosure may be made without departing from the scope of the techniques of this disclosure. The figures are not necessarily to scale. Like numbers used in the figures refer to like components. However, the use of a number to refer to a component in a given figure is not intended to limit the component in another figure labeled with the same number.

DETAILED DESCRIPTION

The disclosed systems and techniques may be used to accurately measure liquid adhesive bead shape; generate response surface profiles of selected liquid adhesives that may be used to characterize the bead shape relative to controlled process parameters; collect in-situ bead shape information (e.g., at a customer site directly using the customer dispensing process equipment); and/or adjust controllable process parameters based on the previously generated response surface profiles to control an automated liquid adhesive dispensing process to improve bead shape. Additionally, or alternatively, to facilitate automated liquid adhesive dispensing process analysis, two-dimensional (2D) or three-dimensional (3D) bead shape patterns may be represented using a one-dimensional (1D) dispensing format.

The systems and technique may be used to generate a response surface profiles of a liquid adhesive for one or more process parameters using a robot, a measuring device, and a processor of a management system. The robot is configured to dispense, based on at least one process parameter (e.g., a reference process parameter), a liquid adhesive bead onto a substrate (e.g., a witness plate). In some examples, the dispense path may include a linear dispense path representing a complex dispense path. The measuring device is configured to measure at least one characteristic of the bead shape (e.g., a reference bead shape). The processor is configured to assemble the measurement data into one or more response surface profiles. In some examples, determining the one or more response surface profiles may be performed in a controlled management environment, such as a laboratory.

In some examples, the systems and techniques also may be used to control an automated liquid adhesive process at a manufacturing site using a robot, a measuring device, and a processor. The manufacturing robot is configured to dispense, based on at least one process parameter, the liquid adhesive bead onto a witness plate. In some examples, the dispense path may include a linear dispense path representing a complex dispense path used in the manufacture of an article. The measuring device is configured to measure at least one characteristic of the bead shape. The processor is configured to determine, based on a reference bead shape and at least one reference process parameter, a response surface profile of the liquid adhesive. Alternatively, the processor may retrieve an existing response surface profile for the liquid adhesive from the management system. The processor may compare the measured bead shape to a reference bead shape and, responsive to determining the measured bead shape is different than the reference bead shape, determine, based on the response surface profile, at least one updated process parameter. The updated process parameter is configured to cause the robot to dispense a second bead having the reference bead shape.

Liquid adhesives are used in industries including medical devices, consumer electronics, automotive, aerospace, and other industrial adhesive extrusion applications. Trends in manufacturing such as light weighting, multi-material assembly, and fatigue resistance are driving increased use of liquid adhesives. As discussed herein, there are many controllable and uncontrollable process parameters involved in automated liquid adhesives dispensing (ALAD) processes. Controllable process parameters may include but are not limited to dispense height, robot speed, screw speed, applied back pressure, and/or resultant adhesive flow rate. Uncontrollable process parameters may include but are not limited to a viscosity of the liquid adhesive, ambient temperature, humidity, and atmospheric pressure. While dispensing is automated with robots, determining thresholds for controllable process parameters is typically a manual process, often performed in iterative steps, to achieve a desired bead shape. Both the bulk properties of the adhesive and the adhesive bead shape are important metrics for evaluating automated dispensing of liquid adhesives. For example, the shape of an adhesive bead (e.g., "bead shape") may include, for example, height, width, and cross-sectional area transverse to a longitudinal axis of the bead (e.g., a cross-sectional profile). In some examples, the bead shape may include other properties of the bead, such as a color or temperature of the bead. If the bead shape is within selected tolerances for a threshold percentage of the length of the bead, then the bond integrity of the adhesive bead may be considered maximized. Such analysis of bead shape may be important for complex patterns of the dispensed adhesive or patterns in which the dispensed adhesive overlaps itself to form a closed path. Additionally, or alternatively, overlap of the beginning and ending of the adhesive bead dispense pattern may be difficult to control and may directly affect bond integrity. The described systems and techniques may be used to facilitate ALAD process control, particularly given different adhesive formulations and plurality of controllable and uncontrollable process parameters, by automating ALAD process parameter selection to reduce human error and accelerate the development of suitable process windows for a given application.

The disclosed systems and techniques may provide advantages over other automated liquid adhesive dispensing process control systems. For example, using accurate bead shape measurement with the generated response surface profiles may shorten automated liquid adhesive dispensing process start-up time by enabling relatively faster automated iterative adjustment of controllable process parameters to achieve a target bead shape compared to manual process parameter adjustment. In some examples, the design of an article that contains an adhesive bond may specifies a target bond-line dimension. The target bond-line dimension may include, for example, a selected width, a selected height (known as "bond line spacing"), and/or a selected total linear length. The target bond-line dimension may be selected to provide sufficient adhesive to withstand the forces on the article. Liquid adhesives, due to the nature of their fluid behavior, are not dispensable in dynamically adjustable rectangular cross-section areas. Instead, liquid adhesives are dispensed as a hemisphere shape with a height, width, and cross section area that often varies as a function of length. Liquid adhesive dispensing robot velocity and/or liquid adhesive flow rate may be controlled to achieve a target bond-line; however, this process may not be combinatorial and/or include additional dependencies such as nozzle orifice size, dispense height from substrate, or on/off timing of the valve. The disclosed systems and technique may be used to enables faster iterative adjustment to desired process settings to reduce time to determine production ALAD process parameters based on design parameters.

Additionally, or alternatively, collecting in-situ bead shape information enables faster and/or regular measurement of bead shape that allows for relatively faster correction of unexpected process changes compared to manual process parameter adjustment. In some examples, there may be an unexpected perturbation that affects the dispensed adhesive profile onto the part. For example, since viscosity is a function of temperature, process settings established in colder winter temperatures will often dispense beads with more "non-sag" behavior or with flow rates requiring high back pressure. However, the same process settings in a warmer summer month often result in higher sag adhesives that flow with lower back pressure. An unexpected increase in a viscosity of the liquid adhesive, ambient temperature may cause the bead height to decrease, which may be corrected by changing the screw speed, applied back pressure, resultant adhesive flow rate, and/or robot speed. Additionally, most "full scale" production requires adhesive lot changeover on a regular basis. For example, a part requiring 1 mL of adhesive that uses a 47.5 mL cartridge in an automated system will require a new cartridge every 47 parts. Although the same adhesive product will be in both cartridges, lot-to-lot variability or shelf life history often results in a different viscosity from cartridge to cartridge. By collecting in-situ bead shape information, however, controllable process parameters may be adjusted, in some examples, automatically, in response to such unexpected process changes. In this way, the disclosed systems and techniques may enable faster detection and adjustment to unexpected process perturbations compared to other ALAD systems.

Additionally, or alternatively, adjusting controllable process parameters based on the previously generated response surface profiles may enable dynamic bead shape control. Dynamic control along a dispense path may be used to compensate for repeatable process variation, which may reduce variation in bead shape. For each robotic dispense system including an articulating robotic arm to control motion of a dispensing head, there may exist systematic variability in the bead dispensed onto a substrate. For example, the robotic motion controls may result in a deceleration over the length of a linear bead path, subsequently changing velocity and bead shape from beginning to end. Additionally, a substrate onto which adhesive is dispensed may include a systematic variation along the dispense path, even if the substrate is within tolerance. As an example, the substrate may be at the thinnest tolerance at beginning of bead and thickest tolerance at end of bead. This may result in a dispense z-height that is ever decreasing across the linear path. It is possible to compensate for these systematic and repeatable process variations by dynamically changing the dispense program, e.g., speeding up the robot from beginning to end.

Additionally, or alternatively, analysis of generated response surface profiles and, optionally, accurate bead shape measurement, may enable optimization of controllable process parameters to improve, for example, part throughput, adhesive utilization, or other process evaluation metrics. Previously discussed examples refer to methods of obtaining and maintaining an optimum bead profile as specified per the part design. However, as in most manufacturing, there are often conflicting optimization goals that must be met for improving cost-of-goods-sold. These can include increasing throughput, reducing adhesive waste, reducing defect rate, or other. By using a response surface methodology for adhesive dispense operation, it is possible to apply additional constraints to the process parameters.

Examples can include maximizing robot velocity to increase throughput, placing a constrained maximum on adhesive cross section to reduce waste, or placing a constrained minimum on adhesive bead height to reduce "starved" bond lines and part failures.

FIG. 1A is a conceptual diagram illustrating an example manufacturing environment 100 for automated liquid adhesive dispensing. As described herein, manufacturing environment 100 is configured to measure and evaluate bead shape for automated process control and improvement. Manufacturing environment 100 includes a management system 110 and a manufacturing site 120.

Management system 110 includes computing device 112, measuring device 114, and management automated liquid adhesive dispensing (ALAD) system 116. The components of management system 110 can be distributed such that components can be local within a control environment and other components can be remote such as executing on a cloud-based computing platform. Management system 110 is configured to characterize a response surface profile as it relates to the bead shape for selected ALAD process parameters of management ALAD system 116. The bead shape may include a reference bead shape and the selected ALAD process parameters may include reference process parameters. To characterize the response surface profile, management system 110 evaluates a plurality of bead shapes, each bead shape of the plurality of bead shapes produced by varying one or more selected ALAD process parameters.

Figure 1B:
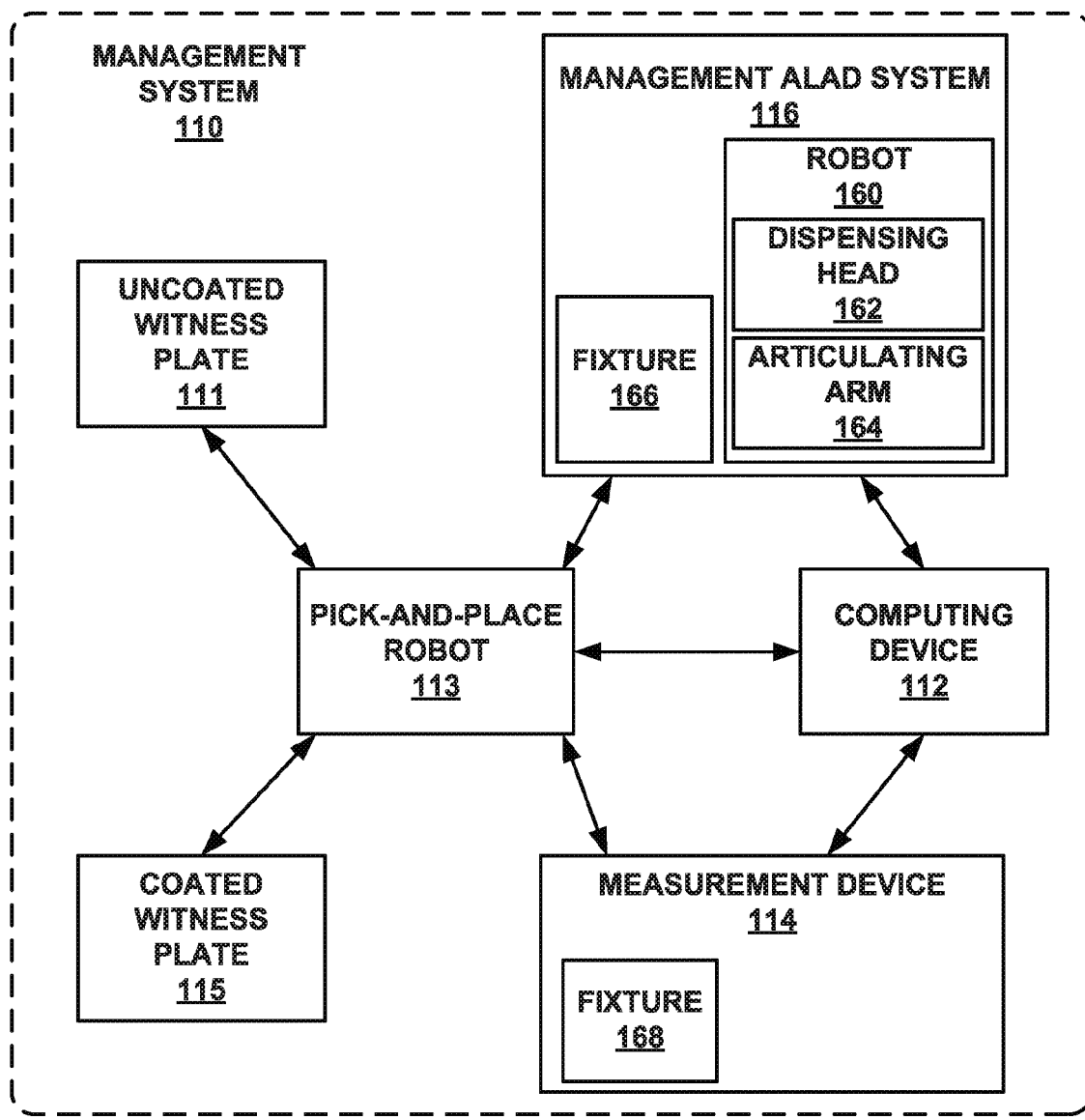
FIG. 1B is a conceptual diagram illustrating management system of the example manufacturing environment illustrated in FIG. 1A.

FIG. 1B is a conceptual diagram illustrating management system of the example manufacturing environment illustrated in FIG. 1A. As illustrated in FIG. 1B, management ALAD system 116 includes a robot 160 configured to dispense a bead 142 of liquid adhesive using selected ALAD process parameters. Robot 160 includes a dispensing head 162 that is configured to dispense the liquid adhesive onto a surface of witness plate 140. Dispensing head 162 may be coupled to an articulating arm 164. In this way, dispensing head 162 may be moveable relative to a fixture 166 configured to engage witness plate 140 onto which the liquid adhesive is dispensed. In some examples, fixture 166 may be moveable relative to robot 160, such as, for example, via a conveyor system or a second articulating arm.

The liquid adhesive may include any adhesive formulation suitable for automated dispensing, such as, for example, a one-part or two-part curing thermoset adhesive or one-part thermoplastic adhesive. The selected ALAD process parameters may include, for example, an adhesive formulation, a type of ALAD robot, a rate of dispensing, a rate of part throughput, a height of the dispensed adhesive from witness plate 140, a velocity vector or a direction vector of dispensing head 162 relative to the surface of the substrate, screw speed, applied back pressure, resultant adhesive flow rate, or the like. In some examples, robot 160 of management ALAD system 116 may operate in a controlled environment. For example, management ALAD system 116 may be configured monitor and control one or more controllable process parameters of robot 160 while dispensing bead 142. In some examples, management ALAD system 116 also may be configured to monitor one or more uncontrollable process parameters while dispensing bead 142.

Bead 142 may be dispensed by dispensing head 162 onto a witness plate 140. Witness plate 140 may include any suitable substrate configured to receive the liquid adhesive. In some examples, witness plate 140 may include a metal, aluminum, a polymer, an acrylic, polypropylene, polyvinyl-chloride, polycarbonate, glass or ceramic. Bead 142 includes a single, linear bead of liquid adhesive.

A linear bead, e.g., a one dimensional (1D) dispense, may be representative of a complex dispense path, such as, a radiused curve, a serpentine shape, overlapping shapes, sharp corners, or the like. For example, radiused curves may be dispensed using substantially constant tangential velocity (e.g., constant absolute speed of dispensing head 162 relative to witness plate 140) and changing x-axis and y-axis velocities. As such, radiused curves may be represented as 1D dispenses of equal length with a constant absolute speed of dispensing head 162 relative to witness plate 140. Overlapped patterns, for example, may be represented as a linear bead of the same length having an initial portion and an ending portion that are configured to overlap to form a bead having uniform thickness. For example, the overlapping initial portion and the ending portion may taper at a selected rate, e.g., by controlling a rate of dispensing and/or speed of dispensing head 162. As another example, sharp curves, e.g., corners of squares or vertices of triangles, may be represented as 1D dispenses by combining x-axis and y-axis vector velocities into an overall magnitude to project the 2D sharp curve onto a 1D approximation. In some examples, one or more of the above describe techniques, or similar technique, may be combined to approximate a complex dispense path as a linear bead. In these ways, a linear bead of liquid adhesive may be used to represent complex dispense paths.

In some examples, measuring a bead shape of a linear bead of liquid adhesive may be faster and/or less computationally intensive compared to measuring complex dispense path. Although illustrated as a linear bead of liquid adhesive, in other example, bead 142 may include any suitable shape and/or a plurality of beads of liquid adhesive. For example, bead 142 may include a plurality of linear beads. In some examples, dispensing a plurality of beads on to witness plate 140, each bead dispensed using different selected controllable process parameters, may reduce time and cost associated in measuring a plurality of bead shapes to generate response surface profiles (discussed in further detail below). For example, rather than using a plurality of witness plates each including a single bead, a plurality of beads may be dispense on a single witness plate and subsequently measured. In other examples, bead 142 may include one or more beads having complex dispense paths, such as, for example, at least one of a radiused curve, an overlap, and/or a sharp curve.

Bead 142 is analyzed by measuring device 114. Measuring device 114 is configured to measure bead shape along a longitudinal axis of bead 142. Bead shape includes, but is not limited to, height $H_1$ from a surface of witness plate 140 to a crest of bead 142, a width $W_1$ along a selected height of bead 142 such as at the surface of witness plate 140, cross sectional area $A_1$ of bead 142 transverse to the longitudinal axis of bead 142, or a symmetry about an axis extending perpendicular from the surface of witness plate 140 to the crest of bead 142. In some examples, measuring device 114 may include a coordinate measuring machine ("CMM") (e.g., the CMM probe may be mechanical, optical, laser, or the like), a structured-light three-dimensional scanner, a laser displacement sensor, another non-contacting optical measurement device, digital image correlation, photogrammetry, or the like. In some examples, measuring device 114 may include a DSMax 3D laser displacement sensor, available from Cognex, Natick, Massachusetts. In some examples, the bead shape may include other properties of the bead, such as a color or temperature of the bead. In example in which bead shape includes other bead properties, such as temperature or color, measuring device 114 may include, additionally or alternatively, an optical camera and/or a thermal camera.

In some examples, measuring device 114 may measure the bead shape with a precision that is less than about 50 microns, such as less than about 25 microns or less than about 10 microns. In other examples, measuring device 114 may measure the bead shape with a precision that is less than a predetermined threshold value (e.g., a tolerance of a geometry of the bead shape).

Measuring device 114 may be configured to measure bead shape at discrete positions along a longitudinal axis of bead 142. For example, measuring device 114 may measure the shape of bead 142 at substantially equally spaced or irregularly spaced sampling intervals. For example, a sampling interval of measuring device 114, e.g., relative to a longitudinal axis of bead 142, may be between about 0.01 mm and about 1 mm, such as about 0.25 mm. Substantially equally spaced sampling intervals may include discrete positions that are equally spaced or nearly equally spaced within common tolerances of the above described measurement devices. The sampling interval may be selected to reduce computational intensity of measuring bead shape.

In some examples, the described systems and technique may be used to represent arbitrary or complex dispensing paths by using a linear model representing complex paths as a series of discrete adhesive beads formed along a linear dispensing path regardless of the actual path formed by the continuous adhesive. This enables more complex paths of continuous adhesive (e.g., curved paths) to be modeled as if the paths were a series of individual beads such measurements and calculations for each bead can be computed as an independent, instantaneous model without having computational dependencies between a current bead and any prior beads deposited along the path. This enables evaluation of bead shape, prediction of adhesive bead shape for complex paths, facilitates optimization of process parameters at reduced complexity and computing resources. For example, rather than modeling bead shape as a complex function, such as a spline function by curve fitting according to the measured data points, bead shape may be modeled as plurality (e.g., series) of discrete positions along the longitudinal axis of bead 142.

Each discrete position of the plurality of discrete positions may include a longitudinal length that is less than a dimension of the bead shape. For example, the longitudinal length of each discrete position of the plurality of discrete positions may be a factor of about ten, such as about 100 or about one thousand, less than a height or a width of bead 142. By measuring bead shape as discrete positions, measuring device 114 may be configured to measure bead shape of a complex dispense path as a series of linear segments. Each linear segment of the series may be measured as a linear bead, as discussed above.

In some examples, measuring device 114, e.g., via computing device 112, may be configured to determine a relation between adjacent discrete positions of the plurality of discrete positions. For example, measuring device 114, e.g., via computing device 112, may be configured to determine, based on a first measured bead shape of a first discrete position and a second measured bead shape of a second discrete position, a first centroid of the first discrete position and a second centroid of the second discrete position. To relate the first discrete position to the second discrete position, measuring device 114, e.g., via computing device 112, may determine, based on a position of the first centroid and a position of the second centroid, a direction vector and/or distance between the first centroid and the second centroid.

In some examples, measuring device 114, e.g., via computing device 112, may not determine a relation between adjacent discrete positions of the plurality discrete positions. Rather, measuring device 114, e.g., via computing device 112, may represent a bead shape of a complex dispense path as a bead shape of a linear dispense path. For example, measuring device 114, e.g., via computing device 112, may apply a linear model to relate at least one process parameter and at least one characteristic of the bead shape at each discrete position of the plurality of discrete positions without a relation to adjacent discrete positions of the plurality of discrete positions along a continuous path defined by bead 142. Not determining a relation between adjacent discrete positions may reduce computation time and/or computational intensity of determining bead shape of a complex dispense path.

Measuring device 114, e.g., via computing device 112, may be configured to determine bead shape based on at least one measured dimension of liquid adhesive bead 142 the measured dimension. For example, cross sectional area $A_1$ may be determined based on a measured height $H_1$ and/or width $W_1$. Measuring device 114 may generate measurement data including a plurality of values that define the shape of bead 142. For example, the measurement data set may include a plurality of tuples, such as a plurality of 3-tuples, where each tuple defines a point on bead 142. Measuring device 114, e.g., via computing device 112, may generate the measurement data set with any selected format readable by computing device 112.

Computing device 112 may include, for example, a desktop computer, a laptop computer, a tablet computer, a workstation, a server, a mainframe, a cloud computing system, a robot controller, or the like. In some examples, computing device 112 may be configured to control operation of management system 110 including, for example, at least one of measuring device 114 or management ALAD system 116. Computing device 112 may be communicatively coupled to at least one of measuring device 114, management ALAD system 116, or network 130 using respective communication connections. In some examples, the communication connection may include a network link, such as Ethernet or other network connections. Such connection may be wireless connection, a wired connection, or a combination of both. In some examples, the communications connections may include other types of device connections, such as, USB, IEEE 1394, or the like. In some examples, measuring device 114 and/or management ALAD system 116 may include one or more processors configured to control operation of measuring device 114 and/or management ALAD system 116, the respective processors being communicatively coupled to computing device 112. Although not shown in FIG. 1, management system 110 may include one or more power sources. For example, one or more power source may be electrically coupled to each of computing device 112, measuring device 114, and management ALAD system 116.

Computing device 112 may be configured to determine, for the selected ALAD process parameters, one or more response surface profiles that include one or more relations between the shape of bead 142 and the one or more selected controllable process parameters (e.g., position of robot 160, robot speed, screw speed, applied back pressure, and/or resultant adhesive flow rate). Computing device 112 may be used to determine a plurality of response surface profiles associated with a selected range of controllable process parameters and/or a plurality of selected controllable process parameters. For example, management system 110 may be used to determine a plurality of response surface profiles associated with a plurality of selected controllable process parameters that include selected ranges of each controllable process parameters of the plurality of selected controllable process parameters. In some examples, computing device 112 may be used to determine a plurality of response surface profiles associated with one or more measured uncontrollable process parameters. In some examples, computing device 112 may store response surface profiles in response surface profiles repository 105. In some examples, computing device 112 may store response surface profiles in a cloud-based computing platform, such as a cloud-based data management system, via network 130. The determined response surface profiles may be used to predict bead shape based on a plurality of known process parameters. In this way, management system 110 may generate response surface profiles that may be used to control an ALAD process to achieve predictable bead shapes based on controllable process parameter inputs and, in some examples, measured uncontrollable process parameters.

Manufacturing site 120 includes one or more manufacturing sites, such as a plurality of customer sites or a plurality of ALAD systems within a single geographic location. Manufacturing site 120 may use the response surface profiles generated by management system 110 to control manufacturing site ALAD system 126. Manufacturing site 120 includes portable computing device 122, portable measuring device 124, and manufacturing site ALAD system 126. In some examples, a user may deliver portable computing device 122 and/or portable measuring device 124 to manufacturing site 120. The user may include, for example, a technician, an operator, or the like. In some examples, portable computing device 122 and portable measuring device 124 may be integrated into a single portable device. In this way, portable computing device 122 and/or portable measuring device 124 may be configured to be delivered on demand to manufacturing site 120. Although described as portable, in some examples, manufacturing site 120 may include nonportable or dedicated computing devices 122 and/or measuring devices 124.

Manufacturing site ALAD system 126 may be substantially similar to management ALAD system 116. For example, manufacturing site ALAD system 126 includes a robot configured to dispense a liquid adhesive. Manufacturing site ALAD system 126, based on site ALAD process parameters, may control the robot to dispense the liquid adhesive for production of a component. In some examples, manufacturing site ALAD system 126 may dispense bead 152 onto witness plate 150 using site ALAD process parameters. For example, a witness plate may be placed, e.g., by the user, onto a fixture within manufacturing site ALAD system 126. Manufacturing site ALAD system 126 may be controlled, e.g., by portable computing device 122, to dispense one or more beads of liquid adhesive onto the witness plate using selected ALAD process parameters. In some examples, the ALAD process parameters may include site ALAD process parameters used for the production of a component, except for the dispensing pattern, which may be one or more linear beads. In this way, bead 152 dispensed onto witness plate 150 may be representative of the process used to produce components.

Bead 152 dispensed onto witness plate 150 may be analyzed by portable measuring device 124. For example, after dispensing bead 152 onto witness plate 150, the user may load witness plate 152 onto a fixture of portable measuring device 124 to measure the bead shape of bead 152. In some examples, measuring device 124 may be substantially similar to measuring device 114, as discussed above. For example, measuring device 124 may include a portable laser displacement sensor. As discussed above, the shape of bead 152, may include but is not limited to, height Hz, width $W_2$, and/or cross-sectional area $A_2$ of bead 152. In some examples, measuring device 124 may generate a measurement data including a plurality of values that define the shape of bead 152.

Computing device 122 is configured to receive from measuring device 124, the measurement data. Computing device 122 also is configured to receive from computing device 112, e.g., via network 130, the determined response surface profiles for the selected ALAD process parameters. In some examples, computing device 122 is further configured to determine, based on the determined response surface profiles and the site ALAD process parameters, a predicted bead shape. For example, computing device may identify regions of the determined response surface profiles having ALAD process parameters corresponding to the site ALAD process parameters.

In some examples, computing device 122 may be configured to determine, based on the determined response surface profiles and the measured shape of bead 152, one or more site ALAD process parameters to achieve a reference bead shape. For example, computing device 122 may correlate the bead shape via the measurement data, selected ALAD process parameters, and the reference bead shape (collectively, the "process data") with one or more response surface profiles associated with a selected type of adhesive. The reference bead shape, e.g., used to generate the response surface profiles, may the same as or different than a target bead shape, e.g., a desired shape of the bead when applied to an article for production. In some examples, the reference bead shape may be determined, by computing device 122, based on a selected target bead shape. After correlating the process data with one or more response surface profiles, computing device 122 may determine one or more updated ALAD process parameters to achieve the reference bead shape. In some examples, computing device 122 may automatically control manufacturing site ALAD system 126 using the updated ALAD process parameters.

During start-up of manufacturing site ALAD system 126, the one or more updated ALAD process parameters may be used to define a process window. For example, computing device 122 may determine first updated ALAD process parameters, automatically control manufacturing site ALAD system 126 using the first updated ALAD process parameters to create a second witness plate. Computing device 122 may determine, based on the second witness plate, second updated ALAD process parameters. Computing device 122 may automatically control manufacturing site ALAD system 126 using the second updated ALAD process parameters. In this way, computing device 122 may perform two or more iterations of determining updated ALAD process parameters until a measured bead shape is within a selected tolerance of the reference bead shape. One or more combinations of ALAD process parameters (or ranges of ALAD process parameters) the result in the measured bead shape being within a selected tolerance of the reference bead shape may define an acceptable process window.

In some examples, computing device 122 may determine a process window stability based on at least one of the process data, the updated ALAD process parameters, or the response surface profiles. For example, computing device 122 may identify, based on one or more combinations of ALAD process parameters within an acceptable process window, a region of a response surface profile. In some examples, computing device 122 may determine one or more gradients within the region of the response surface profile. The gradients include, for example, slopes or second derivatives of the response surface profile. Computing device 122 may determine, based on the determined gradients, the process window stability. For example, a first region of the response surface profile having relatively smaller gradients may be more stable than a second region of the response surface profile having relatively larger gradients. In some examples, computing device 122 may determine the process window stability by comparing the determined gradients to a predetermined gradient threshold value. For example, the predetermined gradient threshold value may include a threshold slope of the response surface profile.

In some examples, rather than determining a gradient, computing device 122 may be configured to determine the process window stability using an optimization algorithm, such as a Bayesian optimization.

Additionally, or alternatively, computing device 122 may be configured to detect and/or compensate for process perturbations. Process perturbations may be caused by, for example, variation in controllable or uncontrollable process parameters. For example, variations in robot speed screw speed, applied back pressure, and/or resultant adhesive flow rate may be due to mechanical wear of components over time, or variations in a viscosity of the liquid adhesive, ambient temperature, ambient humidity, ambient pressure or bulk properties of a particular batch of liquid adhesive may be uncontrollable. To compensate for process perturbations, a user may analyze, using computing device 122, bead shape as discussed above at regular or irregular intervals. If the bead shape is out of specification due to a process perturbation, computing device 122 may determine updated ALAD process parameters to compensate for the process perturbation. In some examples, computing device 122 may be configured to automatically perform regular checks to detect such process perturbation, for example, by altering a user to perform bead shape analysis or controlling one or more robots to perform bead shape analysis. In these ways, the effects of process perturbations may be reduced to improve product throughput and/or improve bond integrity.

In some examples, computing device 122 may be configured to improve control of localized bead shape. Local bead shape may include an inherent, repeatable variability. Computing device 112, based on bead shape analysis, may characterize local bead shape variability. Based on the characterized local bead shape variability, computing device 122 may determine updated ALAD process parameters to compensate for the characterized local bead shape variability. In some examples, computing device 122 may dynamically change process parameters based on the updated ALAD process parameters. For example, computing device 122, based on a characterized local bead shape variability, may dynamically change the robot speed to reduce the local bead shape variability. Compensating for local bead shape variability may improve accuracy of dispensing the liquid adhesive and, thereby, improve bond integrity.

In some examples, computing device 122 may be configured to determine updated ALAD process parameters based on one or more optimization variables. For example, as discussed above, an acceptable process window may include more than one combination of ALAD process parameters that result in a reference bead shape. Computing device 122 may select updated ALAD process parameters that result the one or more optimization variables exceeding a threshold value. The one or more optimized variable may include, for example, part throughput, bead uniformity on corners, threshold of raw material waste, or other process parameters.

In some examples, management system 110 may include an automated process of forming and analyzing witness plates. For example, as illustrated in FIG. 1B, management system 110 may include a pick-and-place robot 113 configured to at least partially automate forming and analyzing witness plates to generate response surface profiles. Although described with respect to management system 110, in other examples, manufacturing site 120 may include a pick-and-place robot configured to at least partially automate forming and analyzing witness plates to analyze bead shapes, which may be used together with generated response surface profiles to determine updated ALAD process parameters other otherwise control manufacturing site ALAD system 126, as discussed above.

Pick-and-place robot 113 may coordinate the movement of witness plates (e.g., witness plate 140) between stations where witness plates 140 are coated, measured, and/or stored. For example, pick-and-place robot 113 may pick-up witness plate 140 from uncoated witness plate supply 111. Pick-and-place robot 113 may place the uncoated witness plate 140 on fixture 166 within management ALAD system 116. As discussed above, management ALAD system 116 may automatically dispense one or more liquid adhesive beads (e.g., bead 142) on to the witness plate 140 using selected ALAD process parameters for each bead. After dispensing the beads, pick-and-place robot 113 removes the coated witness plate 140 from fixture 166 within management ALAD system 116. Pick-and-place robot 113 may place the coated witness plate 140 on fixture 168 within measuring device 114. As discussed above, measuring device 114 may automatically measure bead shapes on witness plate 140, which may be communicated to computing device 112. After measuring the bead shapes, pick-and-place robot 113 removes witness plate 140 from fixture 168 within measuring device 114. Pick-and-place robot 113 then may place the measured witness plate 140 in coated witness plate stock 115. Witness plates 140 in coated witness plate stock 115 may be saved for subsequent investigation, such as re-measurement of bead shape. In some examples, placing the measured witness plate 140 in witness plate stock 115 may include placing the measured witness plate 140 in a specialized storage device, on a convey for transport, or the like. In some examples, one or more steps may be conducted manually without pick-and-place robot 113, such as by a user.

In some examples, computing device 112 is configured to control pick-and-place robot 113, measuring device 114, and management ALAD system 116. For example, computing device 112 may automatically determine batch operation data defining process conditions to generate at least one response surface profile. The batch operation data may include, for example, a range of controllable ALAD process parameters to be sampled, number of samples, sample names, or an operation of any of pick-and-place robot 113, measuring device 114, and management ALAD system 116. In some examples, a user may input at least a portion of the batch operation data. Additionally, or alternatively, the user modified or review the automatically determined batch operation. Computing device 112 may determine, based on the batch operation data, a listing of individual witness plate names and process conditions associated with each witness plate.

Computing device 112 may coordinate the execution of the batch by controlling the operation of pick-and-place robot 113, measuring device 114, and management ALAD system 116. For example, computing device 112 may coordinate local program execution and timing of movements of pick-and-place robot 113. Computing device 112 also may control ALAD process parameters of management ALAD system 116, including execution and timing of movements of robot 160 of management ALAD system 116. Computing device 112 also may communicate witness plate names to measuring device 114 and control execution and timing of movements measuring device 114. Measuring device 114 may communicate measurements to computing device 112 for analysis and storage.

Figure 1C:
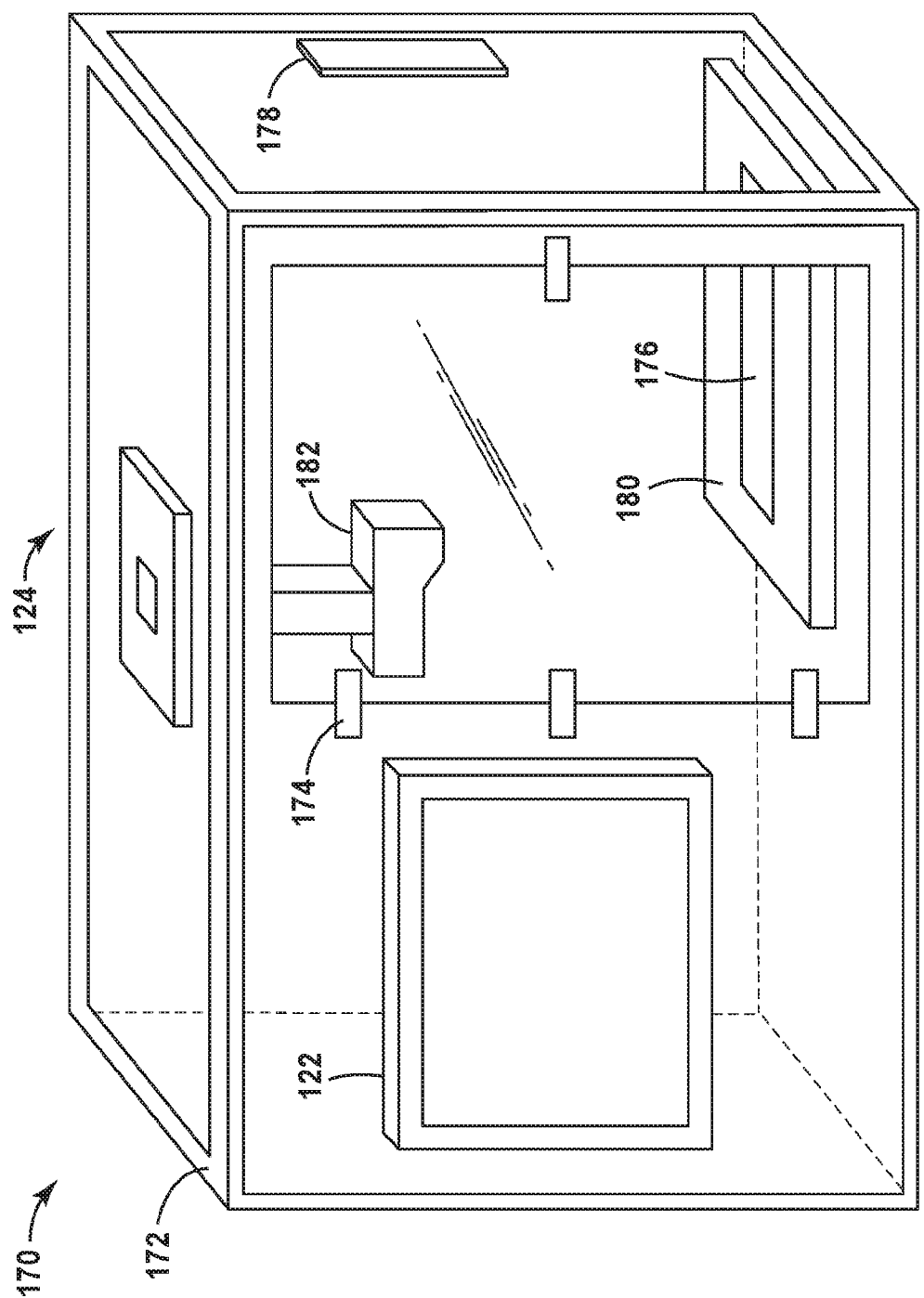
FIG. 1C is a conceptual diagram illustrating an example portable computing device and portable measuring device illustrated in FIG. 1A.

As discussed above, portable computing device 122 and portable measuring device 124 may be integrated into a single portable device. FIG. 1C is a conceptual diagram illustrating an example portable device 121 that may be used in manufacturing site 120. Portable device 121 includes portable computing device 122, portable measuring device 124, and an enclosure 172. Enclosure 172 may include a solid or an open-frame enclosure configured to retain components of computing device 122 and portable measuring device 124. For example, computing device 122 and/or components of portable measuring device 124 may be mounted to sidewalls and/or a frame of enclosure 172. In examples in which enclosure 172 includes a solid enclosure, enclosure 172 includes access door 174. Access door 174 is sized to receive a witness plate 176. To improve portability, in some examples, portable device 121 may include one or more handles 178 mounted to an exterior of one or more sidewalls and/or a frame of portable device 121. Enclosure 172, door 174, and handles 178 may include any suitable material, such as, for example, metals, polymers, aluminium alloys, titanium alloys, steels, high density polyethylene, polypropylene, acrylonitrile butadiene styrene, acrylics, polyvinyl chloride, epoxies, combinations thereof, or the like.

As discussed above, portable measuring device 124 includes fixture 180 and measurement device 182. Fixture 180 may be mounted to a sidewall and/or frame of portable device 121. As discussed above, frame 180 is configured to receive and may secure a witness plate for analysis. Measurement device 182 may include a displacement sensor, an optical camera, and/or a thermal camera, as discussed above. In some examples, portable device 121 may be size to enable proper orientation of measurement device 182 and fixture 180, e.g., to provide a desired resolution for measurement device 182. Additionally, or alternatively, portable device 121 may be size to enable a user to transport portable device 121 and/or insert and remove witness plates from enclosure 172.

Figure 2:
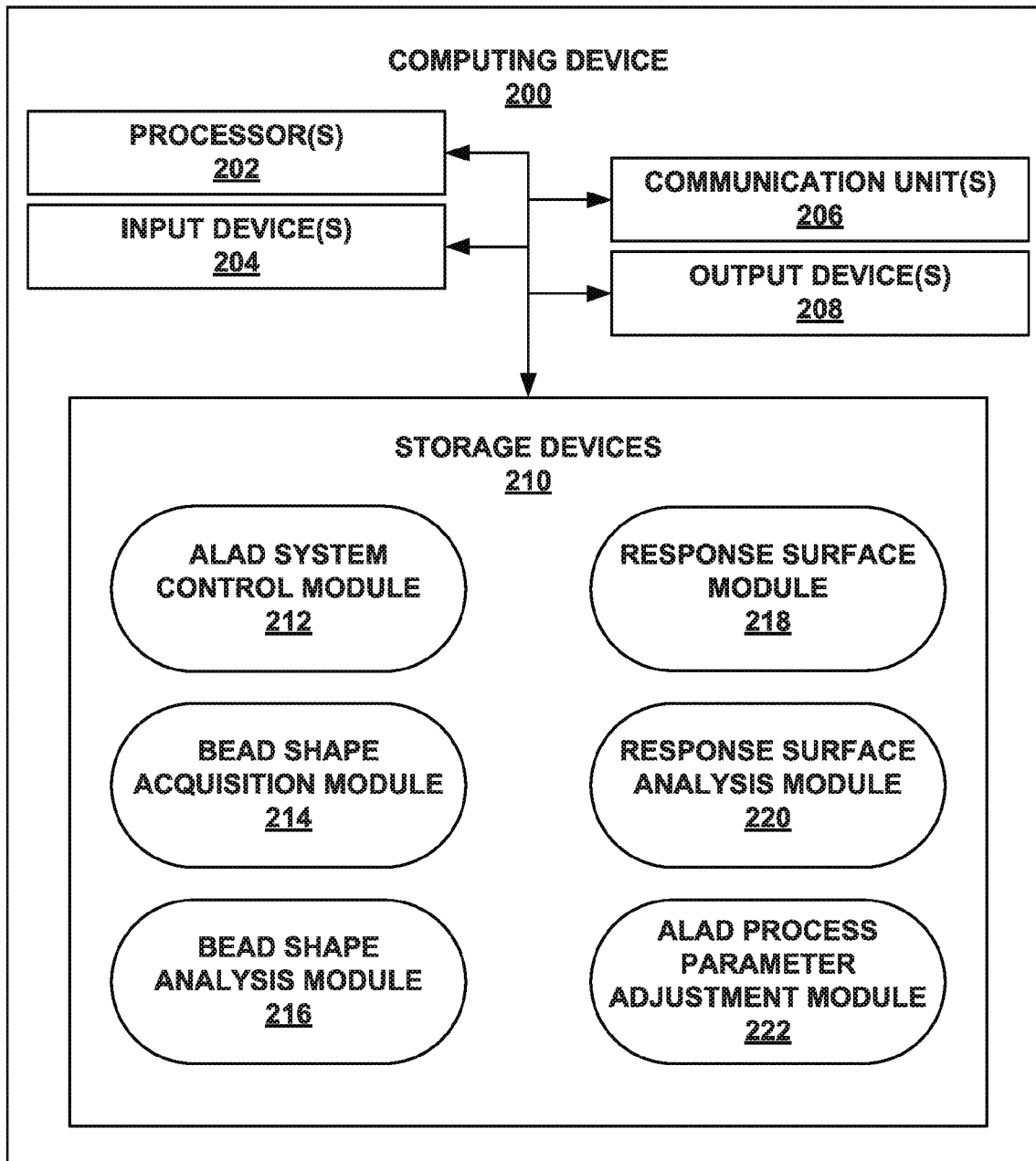
FIG. 2 is a conceptual and schematic block diagram illustrating an example of computing device.

FIG. 2 is a conceptual and schematic block diagram illustrating an example of computing device 200. Computing device 200 is configured to perform the functions of computing devices 112 and 122 discussed above in reference to FIGS. 1A and 1B. In some examples, one or more functions of computing device 200 may be performed by one or more computing devices, such as computing devices 112 and 122. In the example of FIG. 2, computing device 200 includes one or more processors 202, one or more input devices 204, one or more communication units 206, one or more output devices 208, and one or more storage devices 210. In some examples, one or more storage devices 210 include ALAD system control module 212, bead shape acquisition module 214, bead shape analysis module 216, response surface profile module 218, response surface profile analysis module 220, and ALAD process parameter adjustment module 222. In other examples, computing device 200 may include additional components or fewer components than those illustrated in FIG. 2.

One or more processors 202 are configured to implement functionality and/or process instructions for execution within computing device 200. For example, processors 202 may be capable of processing instructions stored by one or more storage devices 210. Examples of one or more processors 202 may include, any one or more of a microprocessor, a controller, a digital signal processor (DSP), an application specific integrated circuit (ASIC), a field-programmable gate array (FPGA), or equivalent discrete or integrated logic circuitry.

Computing device 200 also includes one or more input devices 204. Input devices 204, in some examples, are configured to receive input from a user through tactile, audio, or video sources. Examples of input devices 204 include a mouse, a keyboard, a voice responsive system, video camera, microphone, touchscreen, or any other type of device for detecting a command from a user. For example, a user may input into computing device 200 via input devices 204 batch operation data defining process conditions to generate at least one response surface profile.

Computing device 200 further includes one or more communication units 206. Computing device 200 may utilize communication units 206 to communicate with external devices (e.g., stage 16, mount 18, measuring device 20, and/or coating device 22) via one or more networks, such as one or more wired or wireless networks. Communication unit 44 may be a network interface card, such as an Ethernet card, an optical transceiver, a radio frequency transceiver, or any other type of device that can send and receive information. Other examples of such network interfaces may include WiFi™ radios or USB. In some examples, computing device 200 utilizes communication units 206 to wirelessly communicate with an external device such as a server.

Computing device 200 may further include one or more output devices 208. Output devices 208, in some examples, are configured to provide output to a user using audio or video media. For example, output devices 208 may include a display, a sound card, a video graphics adapter card, or any other type of device for converting a signal into an appropriate form understandable to humans or machines.

One or more storage devices 210 may be configured to store information within computing device 200 during operation. One or more storage devices 210, in some examples, include a computer-readable storage medium or computer-readable storage device. In some examples, one or more storage devices 210 include a temporary memory, meaning that a primary purpose of one or more storage devices 210 is not long-term storage. One or more storage devices 210, in some examples, include a volatile memory, meaning that one or more storage devices 210 does not maintain stored contents when power is not provided to one or more storage devices 210. Examples of volatile memories include random access memories (RAM), dynamic random-access memories (DRAM), static random-access memories (SRAM), and other forms of volatile memories known in the art. In some examples, one or more storage devices 210 are used to store program instructions for execution by processors 202. One or more storage devices 210, in some examples, are used by software or applications running on computing device 200 to temporarily store information during program execution.

In some examples, one or more storage devices 210 may further include one or more storage devices 210 configured for longer-term storage of information. In some examples, one or more storage devices 210 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 200 also may include bead shape acquisition module 214, bead shape analysis module 216, response surface profile module 218, response surface profile analysis module 220, and ALAD process parameter adjustment module 222 (collectively, the "modules"). Each of the modules may be implemented in various ways. For example, one or more of the modules may be implemented as an application or a part of an application executed by one or more processors 202. In other examples, one or more of the modules may be implemented as part of a hardware unit of computing device 200 (e.g., as circuitry). Functions performed by one or more of the modules are explained below with reference to the example flow diagrams illustrated in FIGS. 3A-3C.

Computing device 200 may include additional components that, for clarity, are not shown in FIG. 2. For example, computing device 200 may include a power supply to provide power to the components of computing device 200. Similarly, the components of computing device 200 shown in FIG. 2 may not be necessary in every example of computing device 200.

Figure 3A:
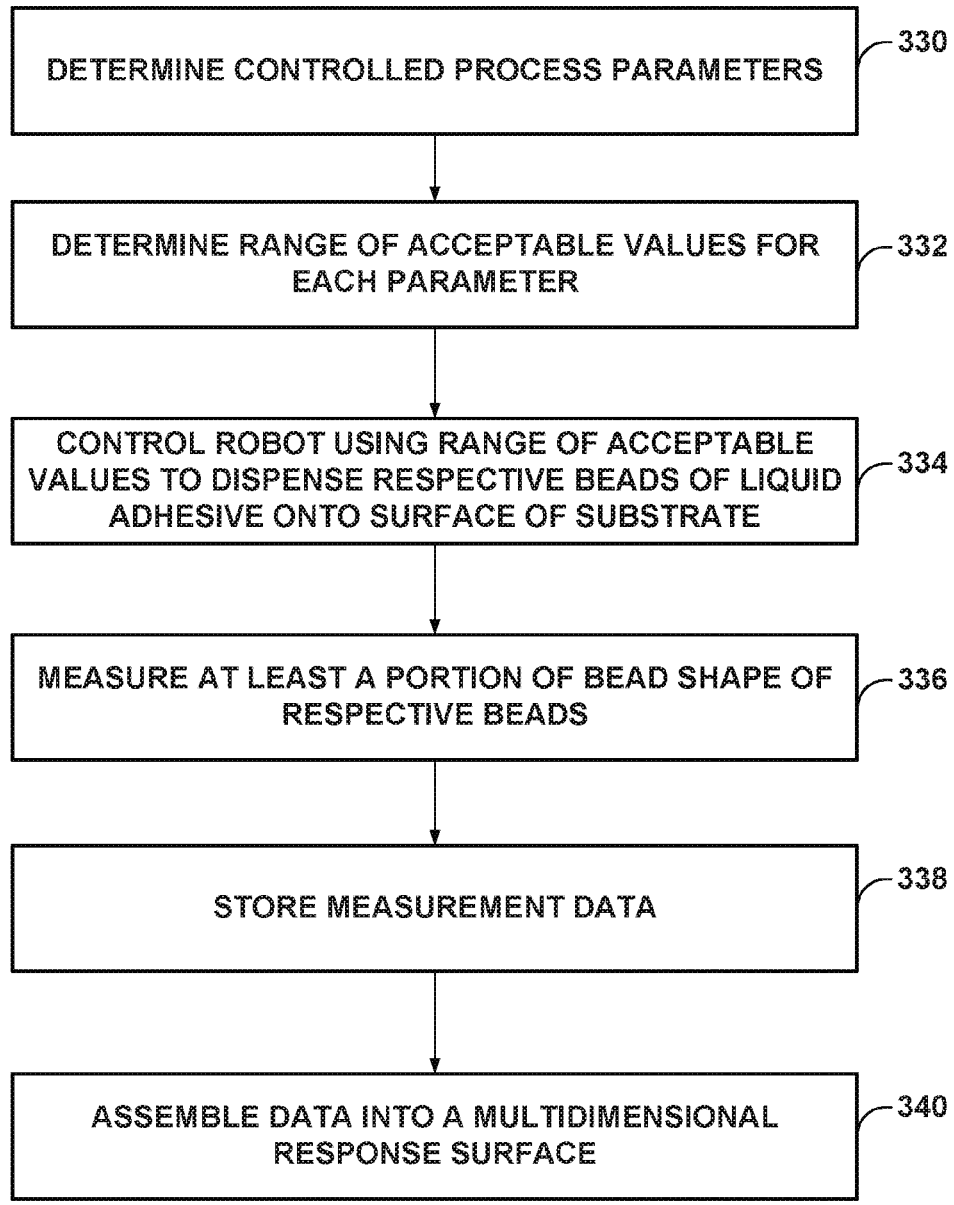
FIG. 3A is a flow diagram of an example technique for generating response surface profiles.

FIG. 3A is a flow diagram of an example technique for generating response surface profiles. Although the technique of FIG. 3A will be described with respect to manufacturing environment 100 of FIGS. 1A and 1B and computing device 200 of FIG. 2, in other examples, the technique of FIG. 3A may be performed using a different system, a different computing device, or both. Additionally, manufacturing environment 100 and computing device 200 may perform other techniques for determining one or more response surface profiles.

In some examples, the response surface profile may be based on a reference bead shape of a reference bead of the liquid adhesive and at least one reference process parameter. For example, as discussed above with respect to FIG. 1, management system 110 may be configured to generate one or more response surface profiles based on measurement data including a plurality of bead shapes and a plurality of selected ALAD process parameters used to produce respective bead shapes of the plurality of bead shapes.

The technique illustrated in FIG. 3A includes determining, by computing device 200, e.g., ALAD system control module 212, one or more controllable process parameters (e.g., the controlled process parameters) (330). In some examples, the controlled process parameters may be automatically determined based on the process parameters that are controllable by computing device 200. In some examples, computing device 200 may automatically determine, or determine based on user input, at least one of an adhesive formulation, a type of ALAD robot, a rate of dispensing, a rate of part throughput, a height of dispensed head 162 from witness plate 140, a velocity vector or a direction vector of dispensing head 162 relative to the surface of witness plate 140, screw speed, applied back pressure, resultant adhesive flow rate, or other controllable process parameter.

The technique illustrated in FIG. 3A also includes determining, by computing device 200, e.g., ALAD system control module 212, a range of acceptable values for each of the controlled process parameters (332). The range of each controlled process parameter may be based on, for example, operational limits of management ALAD system 116 and/or user input. Determining the range of acceptable values may reduce the time and/or the computational resources required to dispense, measure, and analyze a plurality of beads for optimization of a selected ALAD process.

The technique illustrated in FIG. 3A also includes controlling, by computing device 200, e.g., ALAD system control module 212, robot 160 of management ALAD system 116 using selected ALAD process parameters to dispense at least one bead 142 of liquid adhesive onto a witness plate 140 (334). The selected ALAD process parameters may include a subset of the range of acceptable values for each of the controlled process parameters. In some examples, controlling robot 160 may include controlling, by computing device 200, e.g., ALAD system control module 212, dispensing head 162 to dispense the liquid adhesive onto the surface of witness plate 140 and/or articulating arm 164 to control a position and a velocity of dispensing head 162 relative to the surface of witness plate 140.

In some examples, controlling robot 160 may include determining, by computing device 200, e.g., ALAD system control module 212, a linear (1D) dispense path based on a complex dispense path. For example, the technique may include determining, by computing device 200, based on a predetermined complex dispense path (e.g., at least one of a radiused corner, an overlap, or a sharp curve), a linear dispense path representative of the complex dispense path, the linear dispense path including an absolute speed of dispensing head 162 relative to witness plate 140 that includes merged x-axis and y-axis vector velocities and/or a single direction vector of dispense head 162 relative to witness plate 140 that includes merged x-axis and y-axis direction vectors.

The technique illustrated in FIG. 3A also includes controlling, by computing device 200, e.g., bead shape acquisition module 214, measuring device 114 to measure a shape of bead 142 (336). After measuring the shape of bead 142, the technique may include receiving, by computing device 200, e.g., bead shape analysis module 216, measurement data generated by measuring device 114 (338). In some examples, the technique may include determining, by computing device 200, e.g., bead shape analysis module 216, bead shape based on the measured dimension. For example, cross sectional area $A_1$ may be determined based on a measured height $H_1$ and/or width $W_1$.

In some examples, the technique includes adjusting one or more controlled parameters and repeating dispensing of a bead and measuring a bead shape of the bead. In this way, each controlled process parameter may be sequentially adjusted to survey values from the determined range of acceptable values of the controlled process parameters. In some examples, each controlled process parameter may be individually surveyed, e.g., only one process parameter may be adjusted between successive iterations. In this way, management system 110 may be configured to produce and store measurement data related to a survey of a plurality of controlled process parameters.

The technique illustrated in FIG. 3A also includes determining, by computing device 200, e.g., response surface profile module 218, based on the measurement data and the controlled ALAD process parameters the response surface profile. For example, the technique may include correlating or plotting each respective bead shape of a plurality of bead shapes against each respective controlled ALAD process parameter of a plurality of controlled ALAD process parameters that were used to produce the respective bead shape. In some examples, determining a response surface profile 302 may include repeating dispensing, measuring, and analyzing bead shapes to generate one or more response surface profiles.

In some examples, the technique may include automated generation of the response surface profile. For example, determining the response surface profile may include controlling, by computing device 200, e.g., ALAD system control module 212, pick-and-place robot 113 to coordinate movement of witness plates. Controlling pick-and-place robot 113 may include, for example, at least one of controlling pick-and-place robot 113 to pick-up witness plate 140 from uncoated witness plate supply 111; placing the uncoated witness plate 140 on fixture 166 within management ALAD system 116; removing the coated witness plate 140 from fixture 166; placing the coated witness plate 140 on fixture 168 within measuring device 114; removing the measured witness plate 140 from fixture 168; and/or placing the measured witness plate 140 in coated witness plate stock 115.

In some examples, automated generation of the response surface profile may include automatically determining, by computing device 200, e.g., ALAD system control module 212, batch operation data defining process conditions to generate the at least one response surface profile. As discussed above, the batch operation data may include, for example, a range of controllable ALAD process parameters to be sampled, number of samples, sample names, or an operation of any of pick-and-place robot 113, measuring device 114, and management ALAD system 116. In some examples, determining the batch operation data may include determining, by computing device 200, a listing of individual witness plate names and process conditions associated with each witness plate.

In some examples, the technique may include automatically controlling, by computing device 200, e.g., ALAD system control module 212, based on the determined batch operation data, controlling the operation of pick-and-place robot 113, measuring device 114, and management ALAD system 116 to execute the batch. For example, executing the batch may include coordinating, by computing device 200, e.g., ALAD system control module 212, local program execution and timing of movements of pick-and-place robot 113, movements measuring device 114, and/or robot 160 of management ALAD system 116, communicating witness plate names, and/or communicating measurements to computing device 200 for analysis and/or storage.

Figure 3B:
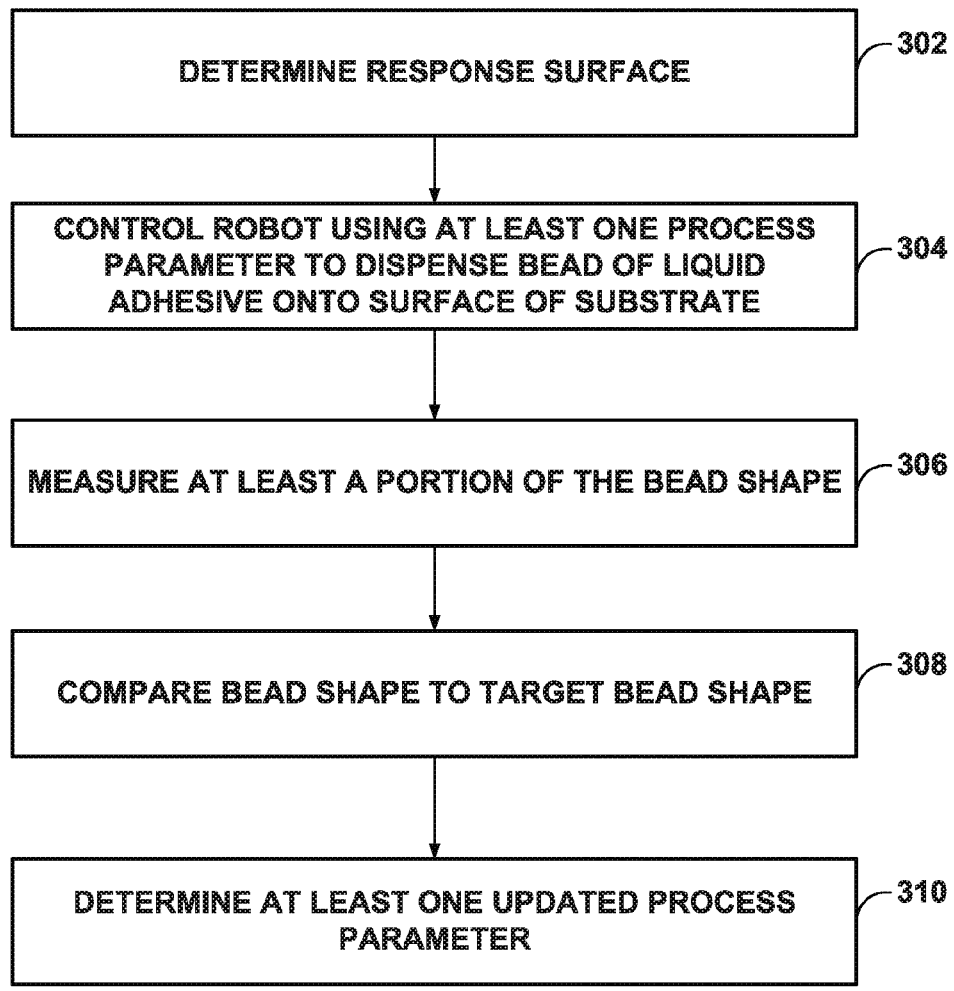
FIG. 3B is a flow diagram of an example technique for controlling an automated liquid adhesive dispensing process using measured bead shapes and response surface profiles.

FIG. 3B is a flow diagram of an example technique for controlling an automated liquid adhesive dispensing process using measured bead shapes and response surface profiles. Although the technique of FIG. 3B will be described with respect to manufacturing environment 100 of FIGS. 1A and 1B and computing device 200 of FIG. 2, in other examples, the technique of FIG. 3B may be performed using a different system, a different computing device, or both. Additionally, manufacturing environment 100 and computing device 200 may perform other techniques for determining one or more response surface profiles.

The technique illustrated in FIG. 3B includes determining, by computing device 200, for example, response surface profile module 218, a response surface profile of the liquid adhesive (302). For example, determining the response surface profile may include the technique discussed above in reference to FIG. 3A.

After determining the response surface profile (302), the technique illustrated in FIG. 3B includes controlling, by computing device 200, e.g., ALAD system control module 212, using at least one site ALAD process parameter, manufacturing site ALAD system 126 to dispense bead 152 of a liquid adhesive onto a surface of witness plate 150 (304). In some examples, controlling manufacturing site ALAD system 126 to dispense bead 152 onto witness plate 150, may include dispensing a plurality of beads, each respective bead of the plurality of beads dispensed using respective site ALAD process parameters of a plurality of site ALAD process parameter. In some examples, controlling manufacturing site ALAD system 126 to dispense bead 152 onto witness plate 150 may be automated with a pick-and-place robot, as discussed above.

After dispensing bead 152, the technique illustrated in FIG. 3B includes controlling, by computing device 200, bead shape acquisition module 214, measuring device 124 to measure a shape of bead 152 (306). After measuring the shape of bead 152, the technique may include receiving, by computing device 200, e.g., bead shape analysis module 216, measurement data generated by measuring device 124. In some examples, the technique may include determining, by computing device 200, e.g., bead shape analysis module 216, bead shape based on the measured dimension. For example, cross sectional area $A_2$ may be determined based on a measured height $H_2$ and/or width $W_2$.

After measuring the bead shape, the technique illustrated in FIG. 3B includes comparing, by computing device 200, e.g., bead shape analysis module 216, the bead shape of bead 152 to the reference bead shape (308). The reference bead shape may the same as or different than a target bead shape. The target bead shape is a desired shape of the bead when applied to an article for production. The reference bead shape may be determined, by computing device 200, based on a selected target bead shape. In some examples, the comparison may include comparing the measured bead shape to the target bead shape. Responsive to determining the bead shape of bead 152 is different than the reference bead shape, the technique includes determining, by computing device 200, e.g., response surface profile analysis module 220, based on the response surface profile, at least one updated process parameter (310). The at least one updated process parameter is configured to cause the robot of manufacturing site ALAD system 126 to dispense a second bead having the reference bead shape.

In some examples, the technique may include generating, by computing device 200, e.g., ALAS process parameter adjustment module 220, an output receivable by manufacturing site ALAD system 126 that is indicative of the at least one updated process parameter. In this way, the technique may include automatically updating the site ALAD process parameters based on measured bead shapes and generated response surface profiles.

In some examples, the technique may include automatically controlling, by computing device 200, e.g., ALAS process parameter adjustment module 220, with the at least one update process parameter, manufacturing site ALAD system 126 to dispense a second bead of a liquid adhesive onto a surface of a second witness plate, the second bead having a second bead shape based on the at least one update process parameter. After dispensing the second bead, the technique may include controlling, computing device 200, bead shape acquisition module 214, measuring device 124 to measure a shape of the second bead. After measuring the bead shape, the technique may include comparing, by computing device 200, e.g., bead shape analysis module 216, the bead shape of the second bead to a target bead shape. Responsive to determining the bead shape of bead 152 is different than the target bead shape, the technique may include determining, by computing device 200, e.g., response surface profile analysis module 220, based on the response surface profile, at least one second updated process parameter. The at least one second updated process parameter is configured to cause the robot of manufacturing site ALAD system 126 to dispense a third bead having the target bead shape. In this way, the technique may include iteratively analyzing a plurality of bead shapes using response surface profiles to control manufacturing site ALAD system 126.

In some examples, the technique may include identifying, by computing device 200, e.g., bead shape analysis module 216, a process window that includes a plurality of site ALAD process parameters resulting one or more bead shapes within a selected tolerance of the target bead shape. In some examples, the technique may include identifying, by computing device 200, e.g., response surface profile analysis module 220, at least one gradient of the response surface profile within the process window. As discussed above, the at least one gradient may be indicative of process stability. In this way, the technique may include evaluating process window stability.

Figure 3C:
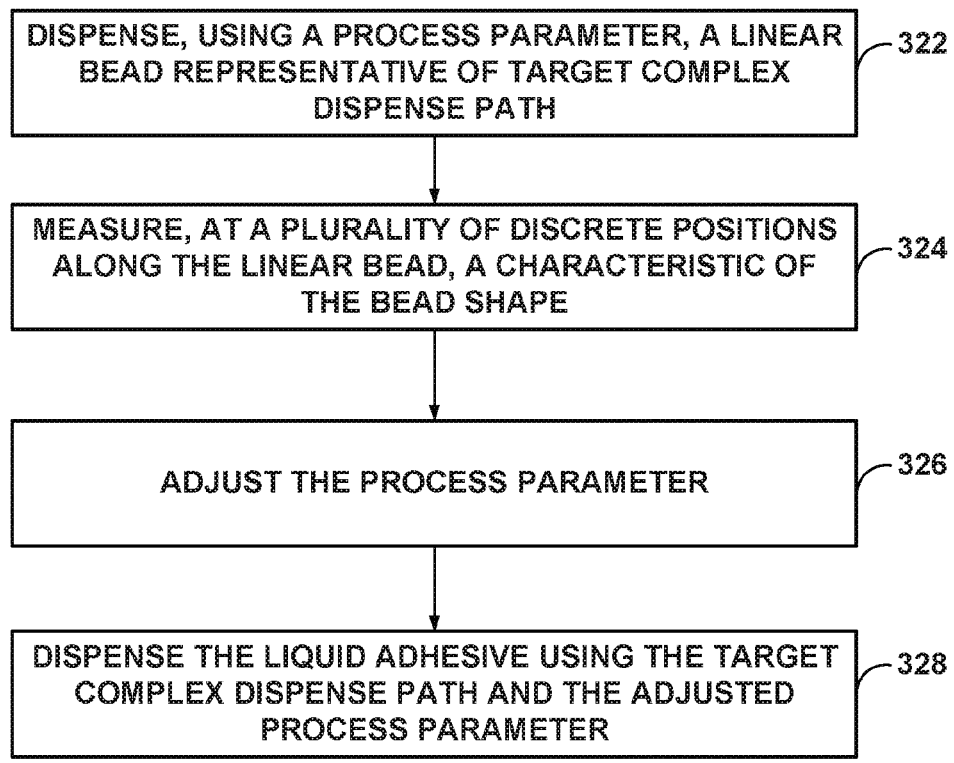
FIG. 3C is a flow diagram of an example for controlling an automated liquid adhesive dispensing process using linear modeling of a bead shape.

FIG. 3C is a flow diagram of an example technique for controlling an automated liquid adhesive dispensing process using linear modeling of a bead shape. Although the technique of FIG. 3C will be described with respect to manufacturing environment 100 of FIGS. 1A and 1B and computing device 200 of FIG. 2, in other examples, the technique of FIG. 3C may be performed using a different system, a different computing device, or both. Additionally, manufacturing environment 100 and computing device 200 may perform other techniques for determining one or more response surface profiles.

The technique illustrated in FIG. 3C includes dispensing, by robot 160 within a manufacturing environment 100 using at least one process parameter, one or more linear beads 142 of a liquid adhesive representative of a target complex dispense path onto a surface of a substrate 140 (322). Linear beads 142 extend along a longitudinal axis and having a bead shape transverse to the longitudinal axis based on the at least one process parameter. The target complex dispense path may include a continuous path. The continuous path may define at least one of a radiused curve, a sharp curve, or an overlap, as discussed above. In some examples, dispensing may include dispensing a plurality of beads of the liquid adhesive, each respective bead of the plurality of beads dispensed using a respective at least one process parameter of a plurality of process parameters.

In some examples, dispensing the one or more linear beads may include controlling, by at least one of the processor of the measuring device or a second processor of the robot, e.g., via computing device 200, robot 160 to dispense the one or more linear beads using at least one process parameter. In examples in which robot 160 includes dispensing head 162 and articulating arm 164, controlling robot 160 may include controlling, by computing device 200, dispensing head 162 to dispense the linear bead of the liquid adhesive onto the surface of witness plate 140; and controlling, by computing device 200, articulating arm 164 to control a position and a velocity of dispensing head 162 relative to the surface of witness plate 140. As discussed above, the at least one process parameter may include at least one of a velocity vector or a direction vector of dispensing head 162 of robot 160 relative to the surface of witness plate 140.

The technique illustrated in FIG. 3C includes measuring, via a one-dimensional scan by a measuring device, e.g., measuring device 114, positioned within the manufacturing environment 100, at a plurality of discrete positions along the longitudinal axis of the linear beads, at least one characteristic of the bead shape (324). The at least one characteristic of the bead shape may include, as discussed above, at least one of a height of the bead relative to the surface of the substrate, a width of the bead relative to a longitudinal axis of the bead at the surface of the substrate, or a cross-sectional area of the bead of the bead transverse to the longitudinal axis. As discussed above, measuring device 114 may include a portable measuring device.

The technique illustrated in FIG. 3C includes adjusting, by a processor of the measuring device, e.g., computing device 200, based on one or more response surface profiles and the at least one characteristic of the bead shape, the at least one process parameter (326). In some examples, the response surface profile may be based on a reference bead shape of a reference bead of the liquid adhesive and at least one reference process parameter. For example, as discussed above with respect to FIG. 1, management system 110 may be configured to generate one or more response surface profiles based on measurement data including a plurality of bead shapes and a plurality of selected ALAD process parameters used to produce respective bead shapes of the plurality of bead shapes. In some examples, the response surface profile is further based on at least one uncontrolled process parameter that may include at least one of a viscosity of the liquid adhesive, ambient temperature, ambient humidity, or ambient pressure.

In some examples, adjusting the at least one process parameter may include accessing, with the processor of the measuring device, e.g., via computing device 200, the one or more response surface profiles of the liquid adhesive defining a reference bead shape of a reference bead of the liquid adhesive and at least one reference process parameter. Adjusting the at least one process parameter also may include comparing, by the processor, e.g., computing device 200, the bead shape to the reference bead shape. Adjusting the at least one process parameter also may include responsive to determining the bead shape is different than the reference bead shape, determining, by the processor, e.g., computing device 200, based on the at least one reference process parameter, the at least one of adjusted process parameter.

In some examples, as discussed above, the response surface profile may be based on a linear model relating the at least one process parameter and the at least one characteristic of the bead shape at each discrete position of the plurality of discrete positions without a relation to adjacent discrete positions of the plurality of discrete positions along the continuous path. Each discrete position of the plurality of discrete positions may be substantially equally spaced from adjacent discrete positions. Additionally, or alternatively, each discrete position of the plurality of discrete positions is between about 0.01 mm and about 1 mm from directly adjacent discrete positions.

The technique illustrated in FIG. 3C also includes dispensing, e.g., using robot 160, the liquid adhesive using the target complex dispense path and the at least one of adjusted process parameter (328).

In some examples, the technique may include identifying, by the processor, e.g., computing device 200, a process window that includes a plurality of process parameters associated with a plurality of bead shapes within a selected tolerance of the bead shape, as discussed above. Additionally, the technique may include identifying, by the processor, e.g., computing device 200, at least one gradient of the response surface profile within the process window, the gradient being indicative of a stability of the at least one process parameter, as discussed above.

EXAMPLES

Example 1: A common bond in many electronics applications is approximately 2 mm wide by 0.5 mm tall in its final, assembled condition. This indicates a target cross-section area profile of 0.5 mm$^2$. Dispensing adhesive with cross-sectional area lower than 0.5 mm$^2$ may result in "insufficient adhesive" and/or a part failure. Dispensing adhesive with cross-sectional area greater than 0.5 mm$^2$ may result in adhesive "squeeze out". For parts that are sensitive to undesired adhesive contact, e.g. near circuitry, this "squeeze out" could also result in part failure. As a result, it is desirable to dispense a bead of adhesive with 0.5 mm$^2$ of cross section area with a height greater than or equal to 0.5 mm. This target bead can be achieved by varying robot velocity, flow rate, z-height, nozzle type, and many other variables. Experiments tested multiple configurations of flow rates and velocities such that the response surface profile could provide a robot velocity and flow rate that optimized the cross-section area of the bead without sacrificing instances of height less than or equal to 0.5 mm.

Example 2: A common perturbation in a manufacturing process is the changeover from a first lot of a liquid adhesive to a second lot of the liquid adhesive. The second lot may have a fluid viscosity different from the first lot. In the event that the fluid viscosity of the second lot is less than a fluid viscosity of the first lot, for example, such that the shape profile changes and/or a height of the bead is reduced, part failures may be experienced. Experiments tested multiple lots of liquid adhesive with varying viscosity profiles to measure and quantify the extent of change in the beads shape profile, and identifying a viscosity at which part failures would be most likely observed. These results may be used to generate response surface profiles that may be used to change process parameter such that the newly perturbed system is designed to remove failures due to lower (or higher) viscosity adhesive.

Example 3: It is possible that during a dispense path, systematic variability may result in changing bead profiles along the linear length of the bead. This may be the result of velocity drift, stress relaxation of the fluid, or changing substrate height. Experiments found systematic variation in that the cross-sectional area of the bead steadily and repeatably decreased along the bead length. To correct for this systemic variability, a variable velocity profile was programmed such that the velocity of the robot decreased steadily along the length of the bead. Changing the velocity along the dispense path better allowed the adhesive bead to maintain target cross-sectional area.

Example 4: As previously mentioned, beads of target cross-sectional area (or height or width) can be obtained through a variety of process settings. In order to further optimize based on additional process constraints, experiments included choosing process settings that achieve desired cross-sectional area with the fastest possible velocity. The result included a dispense path with the shortest cycle time, thus reducing overall cycle time of production and increasing throughput.

FIG. 4 is a graph illustrating example bead shapes as cross-sectional area variation along a longitudinal axis of respective beads, represented as lines 402, 404, 406, and 408. Each of lines 402, 404, 406, and 408 illustrates dispensing of a liquid adhesive using the same liquid adhesive flow rate and different robot speeds. Each of lines 402, 404, 406, and 408 were dispensed at about 3.0 milliliters per second (mL/s). Line 402 corresponds to a robot speed of 42 millimeters per second (mm/s). Line 404 corresponds to a robot speed of 51 mm/s. Line 406 corresponds to a robot speed of 60 mm/s. Line 408 corresponds to a robot speed of 79 mm/s. Although each of lines 402, 404, 406, and 408 included a different robot speed, the results illustrate a substantially consistent bead shape for particular flow rates and linear positions (relative to the longitudinal axis of the bead), even when varying the robot speed. The experiment was also conducted across different flow rates (e.g., 1.1 mL/s, 2.0 mL/s, 4.0 mL/s, and 5.0 mL/s) with similar results. In this way, a response surface profile indicative of bead shape, flow rate, and robot speed, may be used to predict bead shape at a selected linear position based on a known flow rate and robot speed.

Figure 5A:
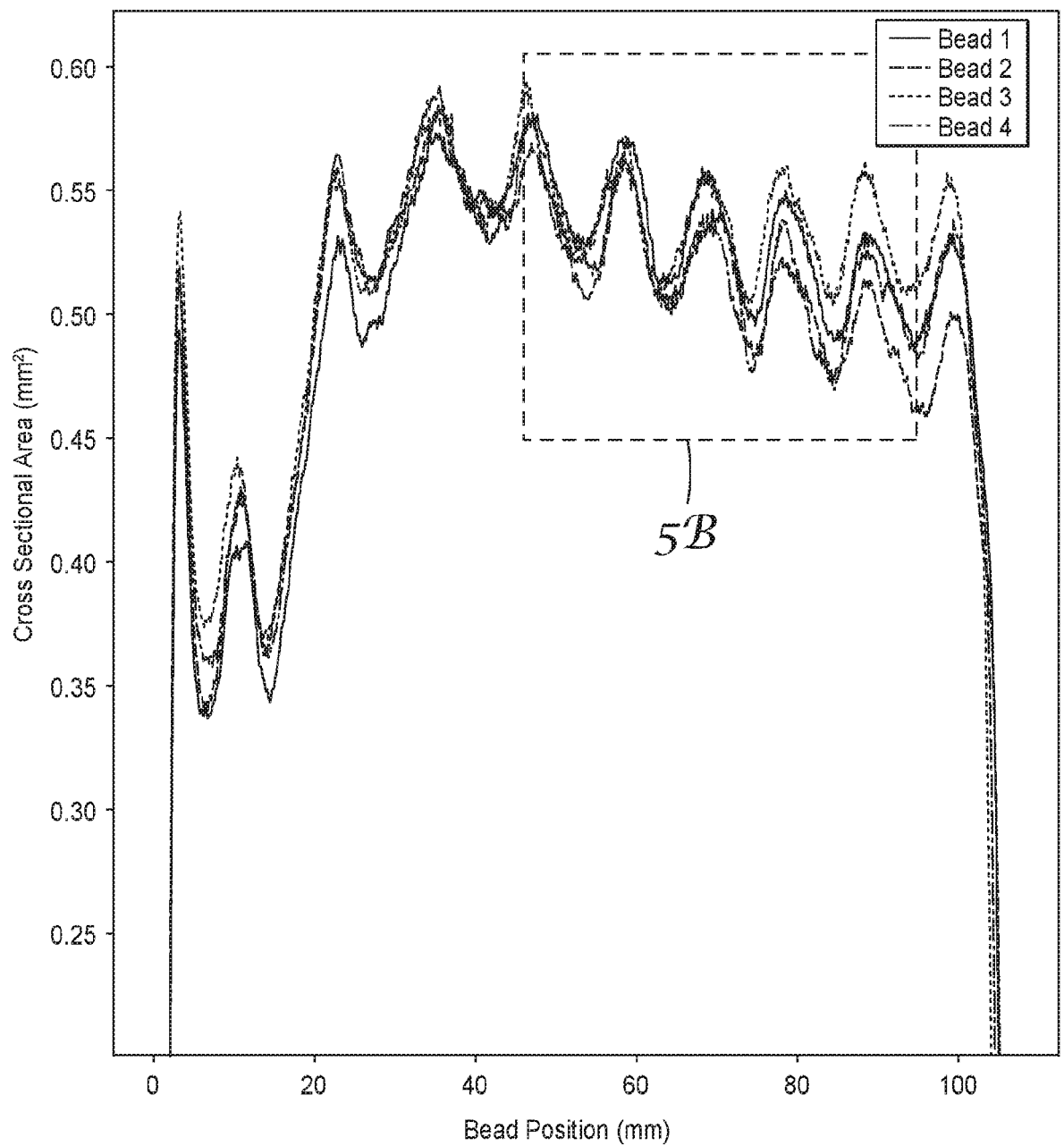
FIG. 5A is a graph illustrating example bead shapes as cross-sectional area variation along a longitudinal axis of respective Beads 1 through 4.
Figure 5B:
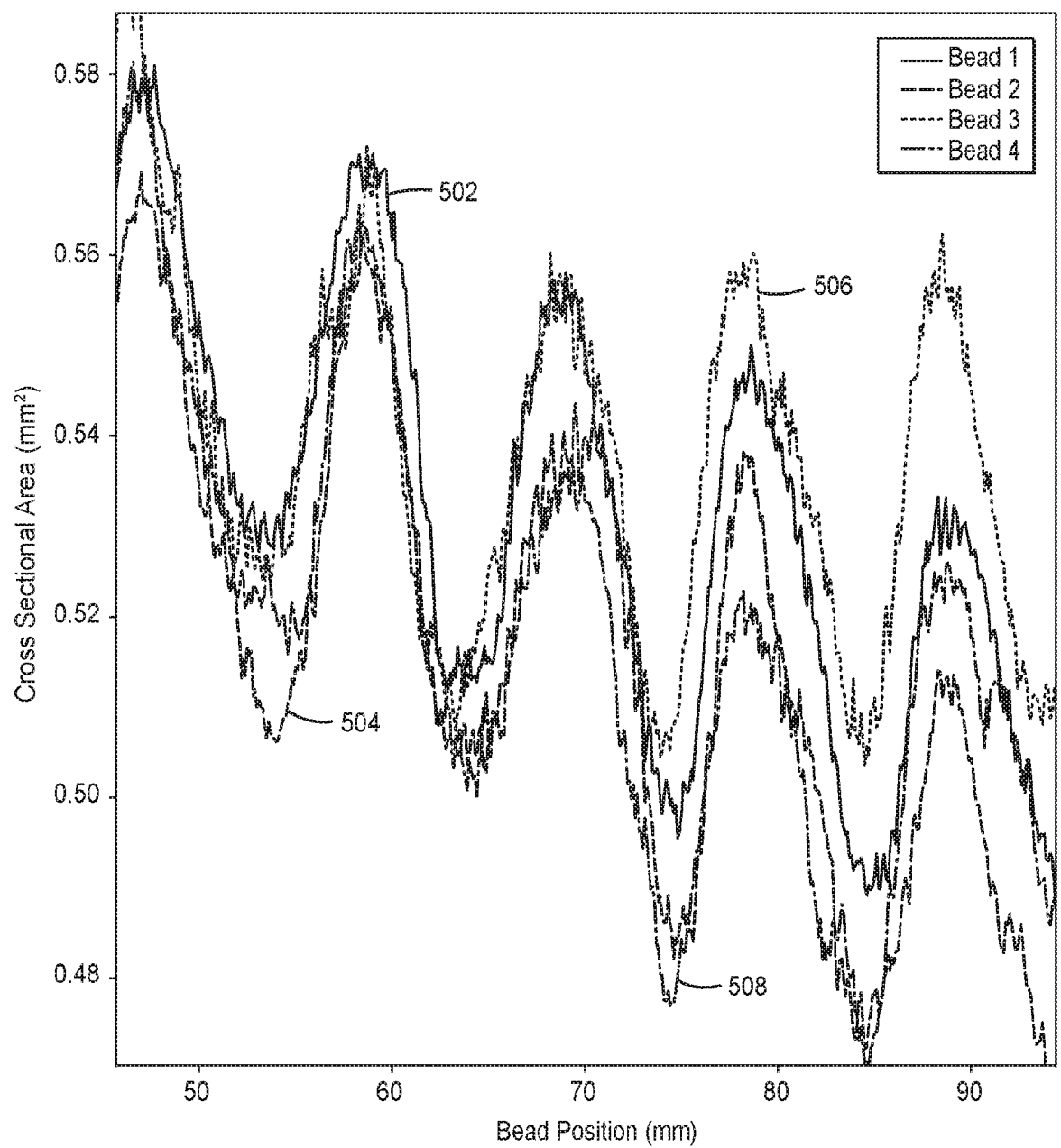
FIG. 5B is illustrates an enlarged portion of FIG. 5A

FIG. 5A is a graph illustrating example bead shapes as cross-sectional area variation along a longitudinal axis of respective Beads 1 through 4. FIG. 5B is illustrates an enlarged portion of FIG. 5A. As best illustrated in FIG. 5B, lines 502, 504, 506, and 508 represent Beads 1 through 4, respectively. Each of lines 502, 504, 506, and 508 illustrates a repeated dispensing of a respective bead using the same liquid adhesive flow rate (5.0 milliliters per minute) and robot speed (30.2 mm/s). The results shown in lines 502, 504, 506, and 508 demonstrated a repeatability in producing bead shape at the same liquid adhesive flow rate and robot speed. For example, even though there is relatively small variations between each of Beads 1 through 4, which may be due to, for example, flow mechanism, robot motion, physical properties of the adhesive, or the like, the variations are repeatable. In other words, the crests and the toughs illustrated in FIG. 5B, are in similar location and similar magnitudes across each of Beads 1 through 4. The experiment was also conducted across different robot speeds (e.g., 21.1 mm/s, 25.6 mm/s, 34.8 mm/s, and 39.2 mm/s) with similar results. These results demonstrated that the bead shape is repeatable for different process parameters, such as robot speed and flow rate. For example, even variation in bead shape, (which may be due to flow mechanism, robot motion, physical properties of the adhesive, or the like) is repeatable. By evaluating repeatable variations, the systems and techniques describe herein may be used to compensate for the variations, for example, by varying flow rate or robot speed.

Figure 6:
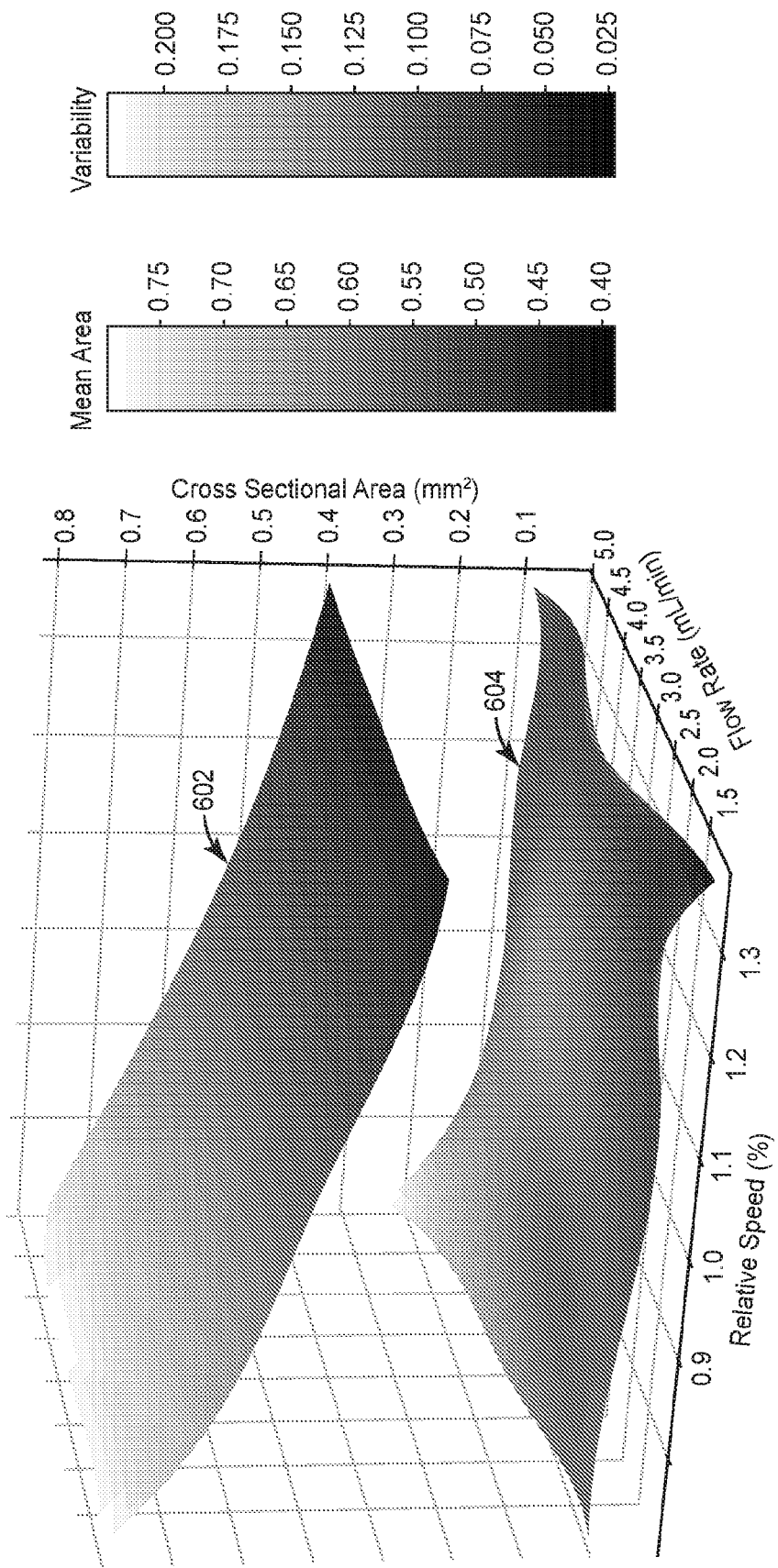
FIG. 6 is a three-dimensional graph illustrating example response surface profiles for the adhesive dispensing process illustrated in FIGS. 4 through 5B.

FIG. 6 is a three-dimensional graph illustrating example response surface profiles for the adhesive dispensing process illustrated in FIGS. 4-5B, as well as similar additional experimental data. The response surface profiles are illustrated as a mean cross-sectional area of each bead (602) and a variability in the cross-sectional area of each bead (604). As discussed above, the response surface profiles may be used, e.g., via response surface methodology, to control ALAD process parameters, such as robot speed and liquid adhesive flow rate, to result in a predicted bead shape. Similar response surface profiles may be generated for other variables including but not limited to bead height, bead width, or other ALAD process parameters.

Figure 7:
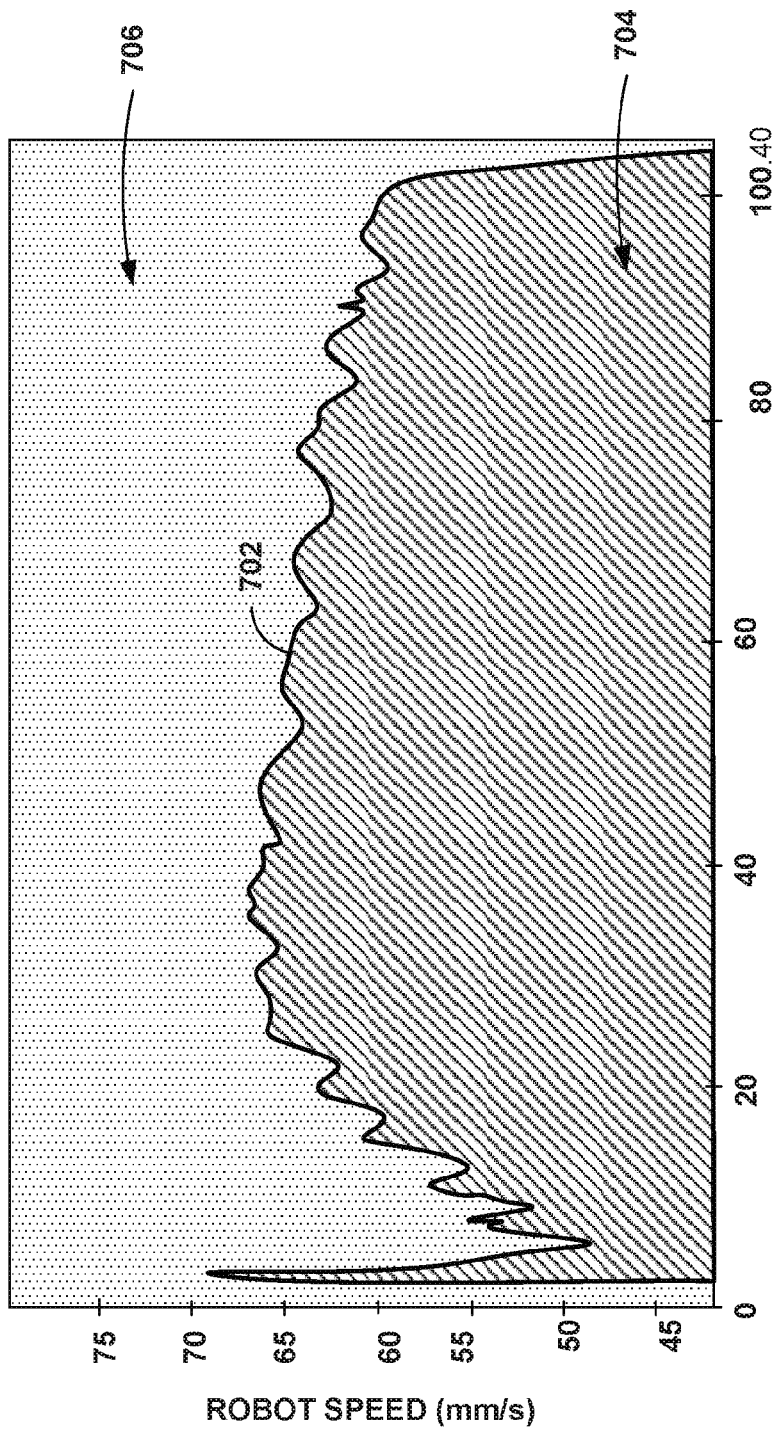
FIG. 7 is a graph illustrating an example velocity profile that may be used to reduce bead shape variability.

FIG. 7 is a graph illustrating an example velocity profile that may be used to reduce bead shape variability. As discussed above, local bead shape may include an inherent, repeatable variability, which may be characterized. For example, line 702 indicates a region of linear position (mm) versus robot speed (mm/s) at a constant flow rate of about 2 mL/min and having a cross-sectional area of about 0.5 mm². Region 704 above line 702 indicates robot speeds at linear positions that would exceed a cross-sectional area of about 0.5 mm². Region 706 below line 702 indicates robot speeds at linear positions that would be less than a cross-sectional area of about 0.5 mm². Hence, the robot speed may be dynamically varied relative to linear position according to line 702 to dispense a bead having a target cross-sectional area of about 0.5 mm². In this way, compensating for local bead shape variability may improve accuracy of dispensing the liquid adhesive and, thereby, improve bond integrity.

Figure 8:
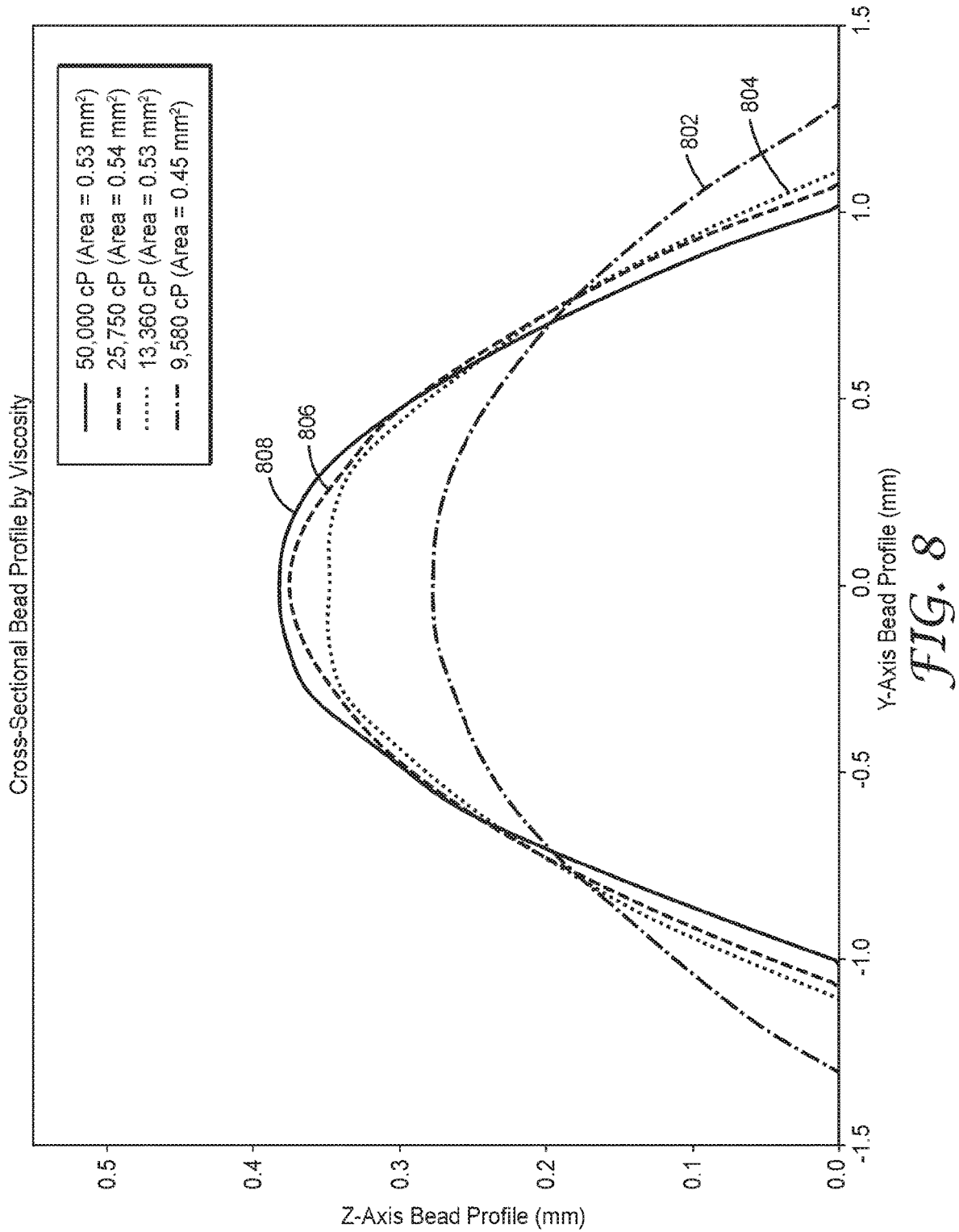
FIG. 8 is a graph illustrating an example bead shape for several liquid adhesive viscosities.

FIG. 8 is a graph illustrating an example bead shape (z-axis profile versus y-axis profile) for several liquid adhesive viscosities: lines 802, 804, 806, and 808. Each of lines 802, 804, 806, and 808 represent a bead of a liquid adhesive having different viscosities. Each bead was dispensed by the same robot using the same ALAD process parameters. As discussed above, liquid adhesive viscosity may affect bead shape. For example, line 802 represents the bead shape for the liquid adhesive having the lowest viscosity of 9,580 centipoise (cP). As illustrated, the height (z-axis bead profile) is the smallest of the four samples, and the width (y-axis bead profile) is the greatest. Lines 808 represents the bead shape for the liquid adhesive having the greatest viscosity of 50,000 cP. Line 808 includes the greatest height (z-axis bead profile) and the smallest width (y-axis bead profile) of the four samples. Lines 804 and 806 represent the third and second greatest viscosities, respectively. Line 804 a liquid adhesive having a viscosity of 13,360 cP showed a greater z-axis bead profile and smaller y-axis bead profile compared to line 802, and a smaller z-axis bead profile and greater y-axis bead profile compared to lines 806 and 808. Line 806 a liquid adhesive having a viscosity of 13,360 cP showed a greater z-axis bead profile and smaller y-axis bead profile compared to lines 802 and 804, and a smaller z-axis bead profile and greater y-axis bead profile compared to line 808. As illustrated in FIG. 8, viscosity has an affect of bead shape, such that a change in liquid adhesive viscosity, e.g., between liquid adhesive batches, may require updating process parameters to maintain a consistent bead shape at least within selected tolerances of an ALAD process.

Various examples have been described. These and other examples are within the scope of the following claims.

What is claimed is:

1. A method comprising:
generating, by a management system, one or more surface profiles, which defines a reference bead shape of a reference bead of a liquid adhesive and at least one reference process parameter, based on measurement data including a plurality of reference bead shapes of the liquid adhesive and a plurality of selected reference process parameters used to produce respective reference bead shapes of the plurality of reference bead shapes;
controlling, using at least one process parameter, a robot within a manufacturing environment to dispense a first bead of a liquid adhesive onto a surface of a substrate, the first bead having a first bead shape based on the at least one process parameter;
measuring, by a portable measuring device positioned within the manufacturing environment, at least one characteristic of the first bead shape;
accessing, with a processor of the portable measuring device, one or more response surface profiles of the liquid adhesive defining a reference bead shape of a reference bead of the liquid adhesive and at least one reference process parameter;
comparing, by the processor, the measured first bead shape to the reference bead shape; and
responsive to determining the first bead shape is different than the reference bead shape, determining, by the processor, based on the at least one reference process parameter, at least one updated process parameter, wherein the at least one updated process parameter is configured to cause the robot to dispense a second bead having a second bead shape, and wherein the updated process parameter is selected such that the second bead shape is closer to the reference bead shape than the first bead shape.

2. The method of claim 1, wherein the method further comprises generating, by the processor, an output receivable by the robot indicative of the at least one updated process parameter.

3. The method of claim 1, wherein the method further comprises:
automatically controlling, using the at least one update process parameter, the robot to dispense a second bead of the liquid adhesive onto a second surface of a second substrate, the second bead having a second bead shape based on the at least one update process parameter;
measuring, by the portable measuring device, at least one second characteristic of the second bead shape;
comparing the second bead shape to the reference bead shape; and
responsive to determining the second bead shape is different than the reference bead shape, determine, based on the at least one reference process parameter, at least one second updated process parameter, wherein the at least one second updated process parameter is configured to cause the robot to dispense a third bead having the reference bead shape.

4. The method of claim 1, wherein the robot comprises a dispensing head and an articulating arm, and wherein controlling the robot comprises:
controlling, by a second processor of the robot, the dispensing head to dispense the first bead of the liquid adhesive onto the surface of the substrate; and
controlling, by the second processor, the articulating arm to control a position and a velocity of the dispensing head relative to the surface of the substrate.

5. The method of claim 4, wherein the at least one process parameter comprises at least one of a velocity vector of a dispensing head of the robot relative to the surface of the substrate, a direction vector of the dispensing head, a screw speed of the dispensing head, or an applied back pressure of the dispensing head.

6. The method of claim 1, wherein the method further comprises:
identifying, by the processor, a process window comprising a plurality of process parameters associated with a plurality of reference bead shapes within a selected tolerance of the reference bead shape,
determining, by the processor, based on the plurality of reference bead shapes within the process window, the at least one updated process parameter;

identifying, by the processor, at least one gradient of the response surface profile within the process window; and determining, by the processor, based on the at least one gradient, the updated process parameter.

7. The method of claim 1, wherein the first bead defines an elongate linear strip extending along a longitudinal axis, and wherein the first bead shape comprises at least one of a height of the first bead relative to the surface of the substrate, a width of the first bead relative to a longitudinal axis of the first bead at the surface of the substrate, or a cross-sectional area of the first bead of the first bead transverse to the longitudinal axis.

8. A system comprising:

a management system configured to generate one or more response surface profiles, which define a reference bead shape of a reference bead of a liquid adhesive and at least one reference process parameter, based on measurement data including a plurality of reference bead shapes of the liquid adhesive and a plurality of selected process parameters used to produce respective reference bead shapes of the plurality of reference bead shapes;

a robot within a manufacturing environment configured to dispense a first bead of a liquid adhesive onto a surface of a substrate, the first bead having a first bead shape based on at least one process parameter of the robot;

a portable measuring device within the manufacturing environment configured to measure at least one characteristic of the first bead shape; and a processor of the portable measuring device configured to:

access one or more response surface profiles of the liquid adhesive defining a reference bead shape of a reference bead of the liquid adhesive and at least one reference process parameter;

compare the measured first bead shape to the reference bead shape; and responsive to determining the first bead shape is different than the reference bead shape, determine, based on the at least one reference process parameter, at least one updated process parameter, wherein the at least one updated process parameter is configured to cause the robot to dispense a second bead having a second bead shape, and wherein the updated process parameter is selected such that the second bead shape is closer to the reference bead shape than the first bead shape.

9. The system of claim 8, wherein:

the portable measuring device is configured to measure at least one second characteristic of the second bead shape, and the processor is further configured to:

compare the second bead shape to the reference bead shape; and responsive to determining the second bead shape is different than the reference bead shape, determine, based on the at least one reference process parameter, at least one second updated process parameter, wherein the at least one second updated process parameter is configured to cause the robot to dispense a third bead, wherein the second updated process parameter is selected such that the third bead shape is closer to the reference bead shape than the second bead shape.

10. The system claim 8, wherein the robot comprises:

a dispensing head configured to dispense the liquid adhesive onto the surface of the substrate; and an articulating arm configured to control a position and a velocity of the dispensing head relative to the surface of the substrate.

11. The system of claim 10, wherein the at least one process parameter comprises at least one of a velocity vector of a dispensing head of the robot relative to the surface of the substrate, a direction vector of the dispensing head, a screw speed of the dispensing head, or an applied back pressure of the dispensing head.

12. The system of claim 8, wherein the response surface profile is further based on at least one of a viscosity of the liquid adhesive, ambient temperature, ambient humidity, or ambient pressure.

13. The system of claim 8, wherein the processor is further configured to:

identify a process window comprising a plurality of process parameters associated with a plurality of reference bead shapes within a selected tolerance of the reference bead shape;

determine, based on the plurality of reference bead shapes within the process window, the updated process parameter; identify at least one gradient of the response surface profile within the process window; and determine, based on the at least one gradient, the updated process parameter.

14. The system of claim 8, wherein the first bead defines an elongate linear strip extending along a longitudinal axis, and wherein the first bead shape comprises at least one of a height of the first bead relative to the surface of the substrate, a width of the first bead relative to a longitudinal axis of the first bead at the surface of the substrate, or a cross-sectional area of the first bead of the first bead transverse to the longitudinal axis.

15. The system of claim 8, wherein the first bead is representative of a target dispense path comprising a continuous path defining at least one of a radiused curve, a sharp curve, or an overlap.

* * * * *